(12) United States Patent
Jiao

(10) Patent No.: US 10,547,359 B2
(45) Date of Patent: Jan. 28, 2020

(54) CALIBRATION DATA

(71) Applicant: Provenance Asset Group LLC, Essex, CT (US)

(72) Inventor: Xianjun Jiao, Beijing (CN)

(73) Assignee: Provenance Asset Group LLC, Pittsford, NY (US)

(*) Notice: Subject to any disclaimer, the term of this patent is extended or adjusted under 35 U.S.C. 154(b) by 31 days.

(21) Appl. No.: 15/668,204

(22) Filed: Aug. 3, 2017

(65) Prior Publication Data

US 2017/0331537 A1    Nov. 16, 2017

Related U.S. Application Data

(63) Continuation of application No. 14/891,022, filed as application No. PCT/CN2013/076597 on May 31, 2013, now Pat. No. 9,755,720.

(51) Int. Cl.
    *H04B 7/0456*    (2017.01)
    *H04B 7/06*      (2006.01)
    (Continued)

(52) U.S. Cl.
    CPC ......... *H04B 7/0456* (2013.01); *H04B 7/0617* (2013.01); *H04B 7/0663* (2013.01); *H04B 7/10* (2013.01); *H04B 17/12* (2015.01)

(58) Field of Classification Search
    CPC .. H04B 7/0456; H04B 7/0617; H04B 7/0663; H04B 7/10; H04B 17/12
    See application file for complete search history.

(56) References Cited

U.S. PATENT DOCUMENTS 5,175,710 A * 12/1992 Hutson .................. G01S 3/802
                                                367/135
5,245,587 A *  9/1993 Hutson .................. G01S 3/802
                                                367/100
(Continued)

FOREIGN PATENT DOCUMENTS

CN    1975324    6/2007
CN    103024154  4/2013
(Continued)

OTHER PUBLICATIONS

Golyandina et al., Analysis of Time Series Structure SSA and Related Techniques, Chapman and Hall/CRC 2001, Chapter 4 (Year: 2001).*

(Continued)

*Primary Examiner* — Michelle M Koeth
(74) *Attorney, Agent, or Firm* — Dinsmore & Shohl LLP

(57) ABSTRACT

Apparatus is provided for: storing at least one three-dimensional matrix C[M][N][K] of calibration data; performing singular value decomposition of each at least one three-dimensional matrix C[M][N][K] of calibration data to produce at least one first unitary rotation matrix U, at least one diagonal scaling matrix S and at least one second unitary rotation matrix V; and resizing each of the at least one first unitary rotation matrix U, the at least one diagonal scaling matrix S and the at least one second unitary rotation matrix V by removing dimensions therefrom, thereby producing resized matrices U, S and V.
Corresponding decompression is also provided.

20 Claims, 7 Drawing Sheets

(51) Int. Cl.
H04B 7/10 (2017.01)
H04B 17/12 (2015.01)

(56) References Cited

U.S. PATENT DOCUMENTS

| | | | | |
|---|---|---|---|---|
| 5,348,020 | A * | 9/1994 | Hutson | A61B 5/044 600/509 |
| 7,653,229 | B2 | 1/2010 | Kaufhold et al. | |
| 8,217,368 | B2 * | 7/2012 | Meyers | G01N 21/21 250/459.1 |
| 8,233,556 | B2 * | 7/2012 | Waters | H01Q 3/2605 375/231 |
| 9,755,720 | B2 * | 9/2017 | Jiao | H04B 7/0456 |
| 2002/0016172 | A1 * | 2/2002 | Kangras | G01S 5/02 455/456.5 |
| 2004/0128331 | A1 * | 7/2004 | Hinds | G06F 9/30025 708/204 |
| 2007/0147519 | A1 * | 6/2007 | Takayama | H03M 7/30 375/246 |
| 2010/0259450 | A1 * | 10/2010 | Kainulainen | G01S 5/02 342/417 |
| 2011/0183684 | A1 * | 7/2011 | Kim | H04N 1/00323 455/456.1 |
| 2011/0194593 | A1 * | 8/2011 | Geirhofer | H04W 72/048 375/224 |
| 2012/0258669 | A1 * | 10/2012 | Honkanen | G01S 3/46 455/67.11 |
| 2013/0003630 | A1 | 1/2013 | Xhafa et al. | |
| 2013/0260798 | A1 * | 10/2013 | Moshfeghi | H04W 4/029 455/456.5 |
| 2014/0093005 | A1 * | 4/2014 | Xia | H04B 7/0617 375/267 |

FOREIGN PATENT DOCUMENTS

| | | |
|---|---|---|
| EP | 2474834 | 7/2012 |
| WO | WO9210880 | 6/1992 |
| WO | WO9530981 | 11/1995 |

OTHER PUBLICATIONS

English Language Machine Translation of Chinese Patent Application Publication No. CN1975324, published on Jun. 6, 2007, 21 pages.
English Language Machine Translation of Chinese Patent Application Publication No. CN103024154, published on Apr. 3, 2013, 15 pages.
PCT International Search Report for Int'l Patent Application No. PCT/CN2013/076597, dated Mar. 6, 2014, 3 pages.
PCT Written Opinion of the International Searching Authority for for Int'l Patent Application No. PCT/CN2013/076597, dated Mar. 6, 2014, 5 pages.
Extended European Search Report for European Patent Application No. 13885945.9, dated Dec. 9, 2016, 11 pages.
Vogt, F., et al., "Fast principal component analysis of large data sets", Elsevier Chemometrics and Intelligent Laboratory Systems 59, accepted May 18, 2001, 18 pages.
Dobrovolny, M., et al., "Asymmetric Image Compression for Embedded Devices based on Singular Value Decomposition", University of Pardubice IEEE International Conference on Applied Electronics, 2011, 4 pages.
Kalliola, K., "High Accuracy Indoor Positioning Based on BLE", Nokia Research Center presentation, Apr. 27, 2011, 16 pages.
Golyandina, N., et al., "Analysis of Time Series Structure SSA and Related Techniques", Chapman & Hall/CRC, 2001, Chapter 4, 23 pages.

* cited by examiner

CALIBRATION DATA

RELATED APPLICATION

This is a continuation application of co-pending U.S. patent application Ser. No. 14/891,022 filed on Nov. 13, 2015, which is a national stage entry of International patent application number PCT/CN2013/076597 filed May 31, 2013, and of which the entire contents are incorporated herein by reference.

FIELD OF THE INVENTION

The present application relates to handling calibration data and to a data structure comprising compressed calibration data.

BACKGROUND TO THE INVENTION

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY OF EMBODIMENTS OF THE INVENTION

Various aspects of examples of the invention are set out in the claims.

A first aspect of the invention provides apparatus comprising at least one processor, at least one memory, and computer-readable code stored on the at least one memory, wherein The computer-readable code when executed may control the at least one processor to perform a method comprising:

storing at least one three-dimensional matrix C[M][N][K] of calibration data;

performing singular value decomposition of each at least one three-dimensional matrix C[M][N][K] of calibration data to produce at least one first unitary rotation matrix U, at least one diagonal scaling matrix S and at least one second unitary rotation matrix V; and resizing each of the at least one first unitary rotation matrix U, the at least one diagonal scaling matrix S and the at least one second unitary rotation matrix V by removing dimensions therefrom, thereby producing resized matrices U, S and V.

The computer-readable code when executed may control the at least one processor to perform: quantising float type data in the resized matrices U, S and V into signed fixed point data.

The computer-readable code when executed may control the at least one processor to perform: causing transmission of a first layer of each of the resized matrices U, S and V. Here, the computer-readable code when executed may control the at least one processor to perform: causing transmission of a second layer of each of the resized matrices U, S and V subsequent to and separately from transmitting the first layers of the resized matrices U, S and V. The computer-readable code when executed may control the at least one processor to perform: causing transmission of third layer of each of the resized matrices U, S and V subsequent to and separately from transmitting the second layers of the resized matrices U, S and V.

The computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by decomposing each of K 2-D matrices X[M][N] into matrices U, S, and V by singular value decomposition to provide resized first unitary rotation matrices U of size M-by-M, resized diagonal scaling matrices S of size M-by-N, and resized second unitary rotation matrices V of size N-by-N, wherein K matrices X[M][N] are provided and wherein each matrix X[M][N] is composed by the first and second dimensions of the three-dimensional matrix C[M][N][K] of calibration data.

Alternatively, the computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by:

swapping over second and third dimensions N and K of the three-dimensional matrix C[M][N][K] of calibration data to provide a rearranged three-dimensional matrix C[M][K][N]; and decomposing each of N 2-D matrix X[M][K] into matrix U, S, and V by singular value decomposition to provide resized first unitary rotation matrices U of size M-by-M, resized diagonal scaling matrices S of size M-by-K, and resized second unitary rotation matrices V of size K-by-K, wherein N matrices X[M][N] are provided and wherein each matrix X[M][K] is composed by the first and second dimensions of the rearranged three-dimensional matrix C[M][N][K].

Further alternatively, the computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by:

rearranging each three-dimensional matrix C[M][N][K] of calibration data by merging second and third dimensions N and K as a first dimension of a single three-dimensional matrix X[N*K][M]; and decomposing the three-dimensional matrix X[N*K][M] by singular value decomposition to produce a resized first unitary rotation matrix U of size N*K-by-N*K, a resized diagonal scaling matrix S of size N*K-by-M, and a resized second unitary rotation matrix V of size M-by-M.

The computer-readable code when executed may control the at least one processor to perform resizing of the first unitary rotation matrix U by discarding one or more columns of the first unitary rotation matrix U. The computer-readable code when executed may control the at least one processor to perform resizing of at least some of the first unitary rotation matrix U by keeping the first P columns and discarding other columns of the first unitary rotation matrix U.

The computer-readable code when executed may control the at least one processor to perform resizing of the diagonal scaling matrix S by discarding one or more columns and one or more rows of the diagonal scaling matrix S. The computer-readable code when executed may control the at least one processor to perform resizing of at least some of the diagonal scaling matrix S by keeping the first Q rows and the first Q columns and discarding other columns and rows of the diagonal scaling matrix S.

The computer-readable code when executed may control the at least one processor to perform resizing of the second unitary rotation matrix V by discarding one or more rows of the second unitary rotation matrix V. The computer-readable code when executed may control the at least one processor to perform resizing of at least some of the second unitary rotation matrix V by keeping the first Q rows and discarding other rows of the second unitary rotation matrix V.

The computer-readable code when executed may control the at least one processor to perform resizing at least some of each of the first unitary rotation matrix U, the diagonal scaling matrix S and the second unitary rotation matrix V by:
  discarding one or more columns of the first unitary rotation matrix U;
  discarding one or more columns and one or more rows of the diagonal scaling matrix S; and
  discarding one or more rows of the second unitary rotation matrix V.

The at least one three-dimensional matrix of calibration data may comprise first and second three-dimensional matrices Cv[M][N][K] and Ch[M][N][K] of calibration data, each three-dimensional matrix relating to a different polarisation.

A second aspect of the invention provides apparatus, comprising at least one processor, at least one memory, and computer-readable code stored on the at least one memory, wherein The computer-readable code when executed may control the at least one processor to perform a method comprising:
  storing data selected from plural matrices of compressed calibration data, wherein the one or more matrices together define at least one three-dimensional matrix C[M][N][K] of uncompressed calibration data and comprise at least one first unitary rotation matrix U, at least one diagonal scaling matrix S and at least one second unitary rotation matrix V obtained by singular value decomposition; and
  causing transmission of the data selected from the plural matrices of compressed calibration data.

The computer-readable code when executed may control the at least one processor to perform: causing transmission of data comprising a first layer of each of the plural matrices of compressed calibration data. The computer-readable code when executed may control the at least one processor to perform: causing transmission data comprising a second layer of each of the plural matrices of compressed calibration data subsequent to and separately from transmitting the data comprising the first layers of the plural matrices of compressed calibration data. The computer-readable code when executed may control the at least one processor to perform: causing transmission of data comprising a third layer of each of the plural matrices of compressed calibration data subsequent to and separately from transmitting the data comprising the second layers of the plural matrices of compressed calibration data.

The plural matrices may together at least partially define at least two three-dimensional matrices C[M][N][K] of uncompressed calibration data, each three-dimensional matrix relating to a different polarisation.

The apparatus may comprises a transmitter, and the computer-readable code when executed may control the at least one processor to perform causing the transmitter to transmit the data selected from the plural matrices of compressed calibration data.

A third aspect of the invention provides apparatus, comprising at least one processor, at least one memory, and computer-readable code stored on the at least one memory, wherein the computer-readable code when executed controls the at least one processor to perform a method comprising:
  receiving data;
  using the received data to reconstruct plural matrices of compressed calibration data, the plural matrices comprising at least one first unitary rotation matrix U, at least one diagonal scaling matrix S and at least one second unitary rotation matrix V; and
  performing matrices multiplication of U, S and V to obtain the reconstructed matrices.

The computer-readable code when executed may control the at least one processor to perform: receiving data comprising a first layer of each of the plural matrices of compressed calibration data separately from other layers of the plural matrices. The computer-readable code when executed may control the at least one processor to perform: using the data comprising the first layer of each of the plural matrices of compressed calibration data to reconstruct the plural matrices of compressed calibration data.

The computer-readable code when executed may control the at least one processor to perform: receiving data comprising a second layer of each of the plural matrices of compressed calibration data subsequent to and separately from receiving the data comprising the first layers of the plural matrices of compressed calibration data.

The computer-readable code when executed may control the at least one processor to perform: using the data comprising a second layer of each of the plural matrices of compressed calibration data to reconstruct the plural matrices of compressed calibration data. Alternatively, the computer-readable code when executed may control the at least one processor to perform: reconstructing the plural matrices of uncompressed calibration data by summing matrices derived from the data comprising the second layer of each of the plural matrices of compressed calibration data with matrices derived from the data comprising the first layer of each of the plural matrices of compressed calibration data.

The computer-readable code when executed may control the at least one processor to perform: receiving data comprising a third layer of each of the plural matrices of compressed calibration data subsequent to and separately from receiving the data comprising the second layers of the plural matrices of compressed calibration data.

The computer-readable code when executed may control the at least one processor to perform: reconstructing the plural matrices of uncompressed calibration data using the data comprising the third layer of each of the plural matrices of compressed calibration data.

The computer-readable code when executed may control the at least one processor to perform: reconstructing the plural matrices of uncompressed calibration data by summing matrices derived from the data comprising the first and second layers of each of the plural matrices of compressed calibration data with matrices derived from the data comprising the third layer of each of the plural matrices of compressed calibration data.

The computer-readable code when executed may control the at least one processor to perform: reconstructing at least two three-dimensional matrices C[M][N][K] of uncompressed calibration data, wherein each three-dimensional matrix relates to a different polarisation.

The computer-readable code when executed may control the at least one processor to perform: calculating a bearing to the apparatus using the plural matrices of uncompressed calibration data.

The computer-readable code when executed may control the at least one processor to perform: deleting the reconstructed calibration data from memory and saving the data comprising the one or more layers of compressed calibration data in memory.

A fourth aspect of the invention provides a data structure comprising:
 data that is configured to be decompressable into matrices of reconstructed calibration data by a method comprising:
  using the data to reconstruct plural matrices of compressed calibration data, the plural matrices comprising at least one first unitary rotation matrix U, at least one diagonal scaling matrix S and at least one second unitary rotation matrix V; and
  performing matrices multiplication of U, S and V to obtain the reconstructed matrices.

The data may be configured to be decompressable into the matrices of reconstructed calibration data by: receiving data comprising a first layer of each of the plural matrices of compressed calibration data separately from other layers of the plural matrices.

The data may be configured to be decompressable into the matrices of reconstructed calibration data by: using the data comprising the first layer of each of the plural matrices of compressed calibration data to reconstruct the plural matrices of compressed calibration data.

The data may be configured to be decompressable into the matrices of reconstructed calibration data by: receiving data comprising a second layer of each of the plural matrices of compressed calibration data subsequent to and separately from receiving the data comprising the first layers of the plural matrices of compressed calibration data.

The data may be configured to be decompressable into the matrices of reconstructed calibration data by: using the data comprising a second layer of each of the plural matrices of compressed calibration data to reconstruct the plural matrices of compressed calibration data.

The data may be configured to be decompressable into the matrices of reconstructed calibration data by: reconstructing the plural matrices of uncompressed calibration data by summing matrices derived from the data comprising the second layer of each of the plural matrices of compressed calibration data with matrices derived from the data comprising the first layer of each of the plural matrices of compressed calibration data.

The data may be configured to be decompressable into the matrices of reconstructed calibration data by: receiving data comprising a third layer of each of the plural matrices of compressed calibration data subsequent to and separately from receiving the data comprising the second layers of the plural matrices of compressed calibration data. The data may be configured to be decompressable into the matrices of reconstructed calibration data by: reconstructing the plural matrices of uncompressed calibration data using the data comprising the third layer of each of the plural matrices of compressed calibration data. The data may be configured to be decompressable into the matrices of reconstructed calibration data by: reconstructing the plural matrices of uncompressed calibration data by summing matrices derived from the data comprising the first and second layers of each of the plural matrices of compressed calibration data with matrices derived from the data comprising the third layer of each of the plural matrices of compressed calibration data.

The data may be configured to be decompressable into the matrices of reconstructed calibration data by: reconstructing at least two three-dimensional matrices $C[M][N][K]$ of uncompressed calibration data, wherein each three-dimensional matrix relates to a different polarisation.

The data may be configured to be decompressable into the matrices of reconstructed calibration data by: calculating a bearing to the apparatus using the plural matrices of uncompressed calibration data.

The data may be configured to be decompressable into the matrices of reconstructed calibration data by: deleting the reconstructed calibration data from memory and saving the data comprising the one or more layers of compressed calibration data in memory.

A fifth aspect of the invention provides a data structure comprising:
 a compressed binary file produced by the apparatus above.

A sixth aspect of the invention provides a method comprising:
 storing at least one three-dimensional matrix $C[M][N][K]$ of calibration data;
 performing singular value decomposition of each at least one three-dimensional matrix $C[M][N][K]$ of calibration data to produce at least one first unitary rotation matrix U, at least one diagonal scaling matrix S and at least one second unitary rotation matrix V; and
 resizing each of the at least one first unitary rotation matrix U, the at least one diagonal scaling matrix S and the at least one second unitary rotation matrix V by removing dimensions therefrom, thereby producing resized matrices U, S and V.

The method may comprise: quantising float type data in the resized matrices U, S and V into signed fixed point data.

The method may comprise: causing transmission of a first layer of each of the resized matrices U, S and V. The method may comprise: causing transmission of a second layer of each of the resized matrices U, S and V subsequent to and separately from transmitting the first layers of the resized matrices U, S and V. The method may comprise: causing transmission of third layer of each of the resized matrices U, S and V subsequent to and separately from transmitting the second layers of the resized matrices U, S and V.

The method may comprise singular value decomposition of each at least one three-dimensional matrix $C[M][N][K]$ of calibration data to produce a first unitary rotation matrix U, a diagonal scaling matrix S and a second unitary rotation matrix V by decomposing each of K 2-D matrices $X[M][N]$ into matrices U, S, and V by singular value decomposition to provide resized first unitary rotation matrices U of size M-by-M, resized diagonal scaling matrices S of size M-by-N, and resized second unitary rotation matrices V of size N-by-N, wherein K matrices $X[M][N]$ are provided and wherein each matrix $X[M][N]$ is composed by the first and second dimensions of the three-dimensional matrix $C[M][N][K]$ of calibration data.

Alternatively, the method may comprise singular value decomposition of each at least one three-dimensional matrix $C[M][N][K]$ of calibration data to produce a first unitary rotation matrix U, a diagonal scaling matrix S and a second unitary rotation matrix V by:

swapping over second and third dimensions N and K of the three-dimensional matrix C[M][N][K] of calibration data to provide a rearranged three-dimensional matrix C[M][K][N]; and decomposing each of N 2-D matrix X[M][K] into matrix U, S, and V by singular value decomposition to provide resized first unitary rotation matrices U of size M-by-M, resized diagonal scaling matrices S of size M-by-K, and resized second unitary rotation matrices V of size K-by-K, wherein N matrices X[M][N] are provided and wherein each matrix X[M][K] is composed by the first and second dimensions of the rearranged three-dimensional matrix C[M][N][K].

Further alternatively the method may comprise singular value decomposition of each at least one three-dimensional matrix C[M][N][K] of calibration data to produce a first unitary rotation matrix U, a diagonal scaling matrix S and a second unitary rotation matrix V by:

rearranging each three-dimensional matrix C[M][N][K] of calibration data by merging second and third dimensions N and K as a first dimension of a single three-dimensional matrix X[N*K][M]; and decomposing the three-dimensional matrix X[N*K][M] by singular value decomposition to produce a resized first unitary rotation matrix U of size N*K-by-N*K , a resized diagonal scaling matrix S of size N*K-by-M, and a resized second unitary rotation matrix V of size M-by-M.

The method may comprise: resizing of the first unitary rotation matrix U by discarding one or more columns of the first unitary rotation matrix U. The method may comprise: resizing of at least some of the first unitary rotation matrix U by keeping the first P columns and discarding other columns of the first unitary rotation matrix U.

The method may comprise: resizing of the diagonal scaling matrix S by discarding one or more columns and one or more rows of the diagonal scaling matrix S. The method may comprise: resizing of at least some of the diagonal scaling matrix S by keeping the first Q rows and the first Q columns and discarding other columns and rows of the diagonal scaling matrix S.

The method may comprise: resizing of the second unitary rotation matrix V by discarding one or more rows of the second unitary rotation matrix V. The method may comprise: resizing of at least some of the second unitary rotation matrix V by keeping the first Q rows and discarding other rows of the second unitary rotation matrix V.

The method may comprise: resizing at least some of each of the first unitary rotation matrix U, the diagonal scaling matrix S and the second unitary rotation matrix V by:

discarding one or more columns of the first unitary rotation matrix U; discarding one or more columns and one or more rows of the diagonal scaling matrix S; and discarding one or more rows of the second unitary rotation matrix V.

The at least one three-dimensional matrix of calibration data may comprise first and second three-dimensional matrices Cv[M][N][K] and Ch[M][N][K] of calibration data, each three-dimensional matrix relating to a different polarisation.

A seventh aspect of the invention provides a method comprising:

storing data selected from plural matrices of compressed calibration data, wherein the one or more matrices together define at least one three-dimensional matrix C[M][N][K] of uncompressed calibration data and comprise at least one first unitary rotation matrix U, at least one diagonal scaling matrix S and at least one second unitary rotation matrix V obtained by singular value decomposition; and causing transmission of the data selected from the plural matrices of compressed calibration data.

The method may comprise: causing transmission of data comprising a first layer of each of the plural matrices of compressed calibration data. The method may comprise: causing transmission data comprising a second layer of each of the plural matrices of compressed calibration data subsequent to and separately from transmitting the data comprising the first layers of the plural matrices of compressed calibration data. The method may comprise: causing transmission of data comprising a third layer of each of the plural matrices of compressed calibration data subsequent to and separately from transmitting the data comprising the second layers of the plural matrices of compressed calibration data.

The plural matrices may together at least partially define at least two three-dimensional matrices C[M][N][K] of uncompressed calibration data, each three-dimensional matrix relating to a different polarisation.

The method may comprise: causing a transmitter to transmit the data selected from the plural matrices of compressed calibration data.

An eighth aspect of the invention provides a method comprising:

receiving data;

using the received data to reconstruct plural matrices of compressed calibration data, the plural matrices comprising at least one first unitary rotation matrix U, at least one diagonal scaling matrix S and at least one second unitary rotation matrix V; and performing matrices multiplication of U, S and V to obtain the reconstructed matrices.

The method may comprise: receiving data comprising a first layer of each of the plural matrices of compressed calibration data separately from other layers of the plural matrices. The method may comprise: using the data comprising the first layer of each of the plural matrices of compressed calibration data to reconstruct the plural matrices of compressed calibration data.

The method may comprise: receiving data comprising a second layer of each of the plural matrices of compressed calibration data subsequent to and separately from receiving the data comprising the first layers of the plural matrices of compressed calibration data. The method may comprise: using the data comprising a second layer of each of the plural matrices of compressed calibration data to reconstruct the plural matrices of compressed calibration data.

Alternatively, the method may comprise: reconstructing the plural matrices of uncompressed calibration data by summing matrices derived from the data comprising the second layer of each of the plural matrices of compressed calibration data with matrices derived from the data comprising the first layer of each of the plural matrices of compressed calibration data.

The method may comprise: receiving data comprising a third layer of each of the plural matrices of compressed calibration data subsequent to and separately from receiving the data comprising the second layers of the plural matrices of compressed calibration data. The method may comprise: reconstructing the plural matrices of uncompressed calibration data using the data comprising the third layer of each of the plural matrices of compressed calibration data. The method may comprise: reconstructing the plural matrices of uncompressed calibration data by summing matrices derived from the data comprising the first and second layers of each of the plural matrices of compressed calibration data with matrices derived from the data comprising the third layer of each of the plural matrices of compressed calibration data.

The method may comprise: reconstructing at least two three-dimensional matrices C[M][N][K] of uncompressed calibration data, wherein each three-dimensional matrix relates to a different polarisation.

The method may comprise: calculating a bearing to apparatus using the plural matrices of uncompressed calibration data.

The method may comprise: deleting the reconstructed calibration data from memory and saving the data comprising the one or more layers of compressed calibration data in memory.

A ninth aspect of the invention provides a computer program comprising machine readable instructions that when executed by computer apparatus control it to perform any of the methods above.

A tenth aspect of the invention provides a non-transitory computer-readable storage medium having stored thereon computer-readable code, which, when executed by computing apparatus causes the computing apparatus to perform a method comprising:
    storing at least one three-dimensional matrix C[M][N][K] of calibration data;
    performing singular value decomposition of each at least one three-dimensional matrix C[M][N][K] of calibration data to produce at least one first unitary rotation matrix U, at least one diagonal scaling matrix S and at least one second unitary rotation matrix V; and
    resizing each of the at least one first unitary rotation matrix U, the at least one diagonal scaling matrix S and the at least one second unitary rotation matrix V by removing dimensions therefrom, thereby producing resized matrices U, S and V.

The computer-readable code when executed may control the at least one processor to perform: quantising float type data in the resized matrices U, S and V into signed fixed point data.

The computer-readable code when executed may control the at least one processor to perform: causing transmission of a first layer of each of the resized matrices U, S and V. Here, the computer-readable code when executed may control the at least one processor to perform: causing transmission of a second layer of each of the resized matrices U, S and V subsequent to and separately from transmitting the first layers of the resized matrices U, S and V. The computer-readable code when executed may control the at least one processor to perform: causing transmission of third layer of each of the resized matrices U, S and V subsequent to and separately from transmitting the second layers of the resized matrices U, S and V.

The computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by decomposing each of K 2-D matrices X[M][N] into matrices U, S, and V by singular value decomposition to provide resized first unitary rotation matrices U of size M-by-M, resized diagonal scaling matrices S of size M-by-N, and resized second unitary rotation matrices V of size N-by-N, wherein K matrices X[M][N] are provided and wherein each matrix X[M][N] is composed by the first and second dimensions of the three-dimensional matrix C[M][N][K] of calibration data.

Alternatively, the computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by:
    swapping over second and third dimensions N and K of the three-dimensional matrix C[M][N][K] of calibration data to provide a rearranged three-dimensional matrix C[M][K][N]; and
    decomposing each of N 2-D matrix X[M][K] into matrix U, S, and V by singular value decomposition to provide resized first unitary rotation matrices U of size M-by-M, resized diagonal scaling matrices S of size M-by-K, and resized second unitary rotation matrices V of size K-by-K, wherein N matrices X[M][N] are provided and wherein each matrix X[M][K] is composed by the first and second dimensions of the rearranged three-dimensional matrix C[M][N][K].

Further alternatively, the computer-readable code when executed may control the at least one processor to perform singular value decomposition of each at least one three-dimensional matrix C[M][N][K] of calibration data to produce a first unitary rotation matrix U, a diagonal scaling matrix S and a second unitary rotation matrix V by:
    rearranging each three-dimensional matrix C[M][N][K] of calibration data by merging second and third dimensions N and K as a first dimension of a single three-dimensional matrix X[N*K][M]; and
    decomposing the three-dimensional matrix X[N*K][M] by singular value decomposition to produce a resized first unitary rotation matrix U of size N*K-by-N*K, a resized diagonal scaling matrix S of size N*K-by-M, and a resized second unitary rotation matrix V of size M-by-M.

The computer-readable code when executed may control the at least one processor to perform resizing of the first unitary rotation matrix U by discarding one or more columns of the first unitary rotation matrix U. The computer-readable code when executed may control the at least one processor to perform resizing of at least some of the first unitary rotation matrix U by keeping the first P columns and discarding other columns of the first unitary rotation matrix U.

The computer-readable code when executed may control the at least one processor to perform resizing of the diagonal scaling matrix S by discarding one or more columns and one or more rows of the diagonal scaling matrix S. The computer-readable code when executed may control the at least one processor to perform resizing of at least some of the diagonal scaling matrix S by keeping the first Q rows and the first Q columns and discarding other columns and rows of the diagonal scaling matrix S.

The computer-readable code when executed may control the at least one processor to perform resizing of the second unitary rotation matrix V by discarding one or more rows of the second unitary rotation matrix V. The computer-readable code when executed may control the at least one processor to perform resizing of at least some of the second unitary rotation matrix V by keeping the first Q rows and discarding other rows of the second unitary rotation matrix V.

The computer-readable code when executed may control the at least one processor to perform resizing at least some of each of the first unitary rotation matrix U, the diagonal scaling matrix S and the second unitary rotation matrix V by:
    discarding one or more columns of the first unitary rotation matrix U;

discarding one or more columns and one or more rows of the diagonal scaling matrix S; and discarding one or more rows of the second unitary rotation matrix V.

The at least one three-dimensional matrix of calibration data may comprise first and second three-dimensional matrices Cv[M][N][K] and Ch[M][N][K] of calibration data, each three-dimensional matrix relating to a different polarisation.

An eleventh aspect of the invention provides a non-transitory computer-readable storage medium having stored thereon computer-readable code, which, when executed by computing apparatus causes the computing apparatus to perform a method comprising:

storing data selected from plural matrices of compressed calibration data, wherein the one or more matrices together define at least one three-dimensional matrix C[M][N][K] of uncompressed calibration data and comprise at least one first unitary rotation matrix U, at least one diagonal scaling matrix S and at least one second unitary rotation matrix V obtained by singular value decomposition; and causing transmission of the data selected from the plural matrices of compressed calibration data.

The computer-readable code when executed may control the at least one processor to perform: causing transmission of data comprising a first layer of each of the plural matrices of compressed calibration data. The computer-readable code when executed may control the at least one processor to perform: causing transmission data comprising a second layer of each of the plural matrices of compressed calibration data subsequent to and separately from transmitting the data comprising the first layers of the plural matrices of compressed calibration data. The computer-readable code when executed may control the at least one processor to perform: causing transmission of data comprising a third layer of each of the plural matrices of compressed calibration data subsequent to and separately from transmitting the data comprising the second layers of the plural matrices of compressed calibration data.

The plural matrices may together at least partially define at least two three-dimensional matrices C[M][N][K] of uncompressed calibration data, each three-dimensional matrix relating to a different polarisation.

The computer-readable code when executed may control the at least one processor to perform causing a transmitter to transmit the data selected from the plural matrices of compressed calibration data.

A twelfth aspect of the invention provides a non-transitory computer-readable storage medium having stored thereon computer-readable code, which, when executed by computing apparatus causes the computing apparatus to perform a method comprising:

receiving data;

using the received data to reconstruct plural matrices of compressed calibration data, the plural matrices comprising at least one first unitary rotation matrix U, at least one diagonal scaling matrix S and at least one second unitary rotation matrix V; and performing matrices multiplication of U, S and V to obtain the reconstructed matrices.

The computer-readable code when executed may control the at least one processor to perform: receiving data comprising a first layer of each of the plural matrices of compressed calibration data separately from other layers of the plural matrices. The computer-readable code when executed may control the at least one processor to perform: using the data comprising the first layer of each of the plural matrices of compressed calibration data to reconstruct the plural matrices of compressed calibration data.

The computer-readable code when executed may control the at least one processor to perform: receiving data comprising a second layer of each of the plural matrices of compressed calibration data subsequent to and separately from receiving the data comprising the first layers of the plural matrices of compressed calibration data.

The computer-readable code when executed may control the at least one processor to perform: using the data comprising a second layer of each of the plural matrices of compressed calibration data to reconstruct the plural matrices of compressed calibration data. Alternatively, the computer-readable code when executed may control the at least one processor to perform: reconstructing the plural matrices of uncompressed calibration data by summing matrices derived from the data comprising the second layer of each of the plural matrices of compressed calibration data with matrices derived from the data comprising the first layer of each of the plural matrices of compressed calibration data.

The computer-readable code when executed may control the at least one processor to perform: receiving data comprising a third layer of each of the plural matrices of compressed calibration data subsequent to and separately from receiving the data comprising the second layers of the plural matrices of compressed calibration data.

The computer-readable code when executed may control the at least one processor to perform: reconstructing the plural matrices of uncompressed calibration data using the data comprising the third layer of each of the plural matrices of compressed calibration data.

The computer-readable code when executed may control the at least one processor to perform: reconstructing the plural matrices of uncompressed calibration data by summing matrices derived from the data comprising the first and second layers of each of the plural matrices of compressed calibration data with matrices derived from the data comprising the third layer of each of the plural matrices of compressed calibration data.

The computer-readable code when executed may control the at least one processor to perform: reconstructing at least two three-dimensional matrices C[M][N][K] of uncompressed calibration data, wherein each three-dimensional matrix relates to a different polarisation.

The computer-readable code when executed may control the at least one processor to perform: calculating a bearing to the apparatus using the plural matrices of uncompressed calibration data.

The computer-readable code when executed may control the at least one processor to perform: deleting the reconstructed calibration data from memory and saving the data comprising the one or more layers of compressed calibration data in memory.

Bluetooth Low Energy or BLE as used herein denotes Bluetooth Core Specification Version 4.0 or later versions that are backwards-compatible with Version 4.0. A BLE device or component is a device or component that is compatible with Bluetooth Core Specification Version 4.0.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF VARIOUS EMBODIMENTS

BLE technology has been proposed to be used in high accuracy indoor positioning (HAIP) systems. HAIP with BLE uses an array of phased antennas to calculate angle-of-departure or angle-of-arrival of a signal. The principles behind calculating the angle-of-departure or angle-of-arrival are described in the prior art.

There are two main options for positioning a mobile device or beacon in a BLE HAIP system. The same applies to other MIMO antenna systems, and to other beamforming systems.

In a first option, the mobiles/tags transmit a BLE positioning packet, which is received at a base station (which can be called a locator) including an antenna array. The base station (or some other device) measures the angle-of-arrival (both azimuth and elevation angles) of the signal using samples of the positioning packet received at different elements of the antenna array, and consequently calculates the position of the mobile/tag. This can be called network-centric positioning. The network-centric approach is limited by capacity.

In a second option, a base station includes an antenna array and transmits a BLE positioning packet from different elements of the antenna array in a way that allows the mobile/tag to calculate the angle-of-departure (both azimuth and elevation angles) of the signal from the base station. The base station here can be termed a beacon. This can be termed mobile-centric positioning. The mobile-centric case is advantageous from the capacity point of view as any number of devices can measure and use broadcast signals for positioning purposes.

A base station or beacon may be able to operate according to both options.

It is the mobile-centric option that is of primary interest in the following, although of course a beacon may operate in the mobile-centric mode as well as the network-centric mode.

Figure 1:
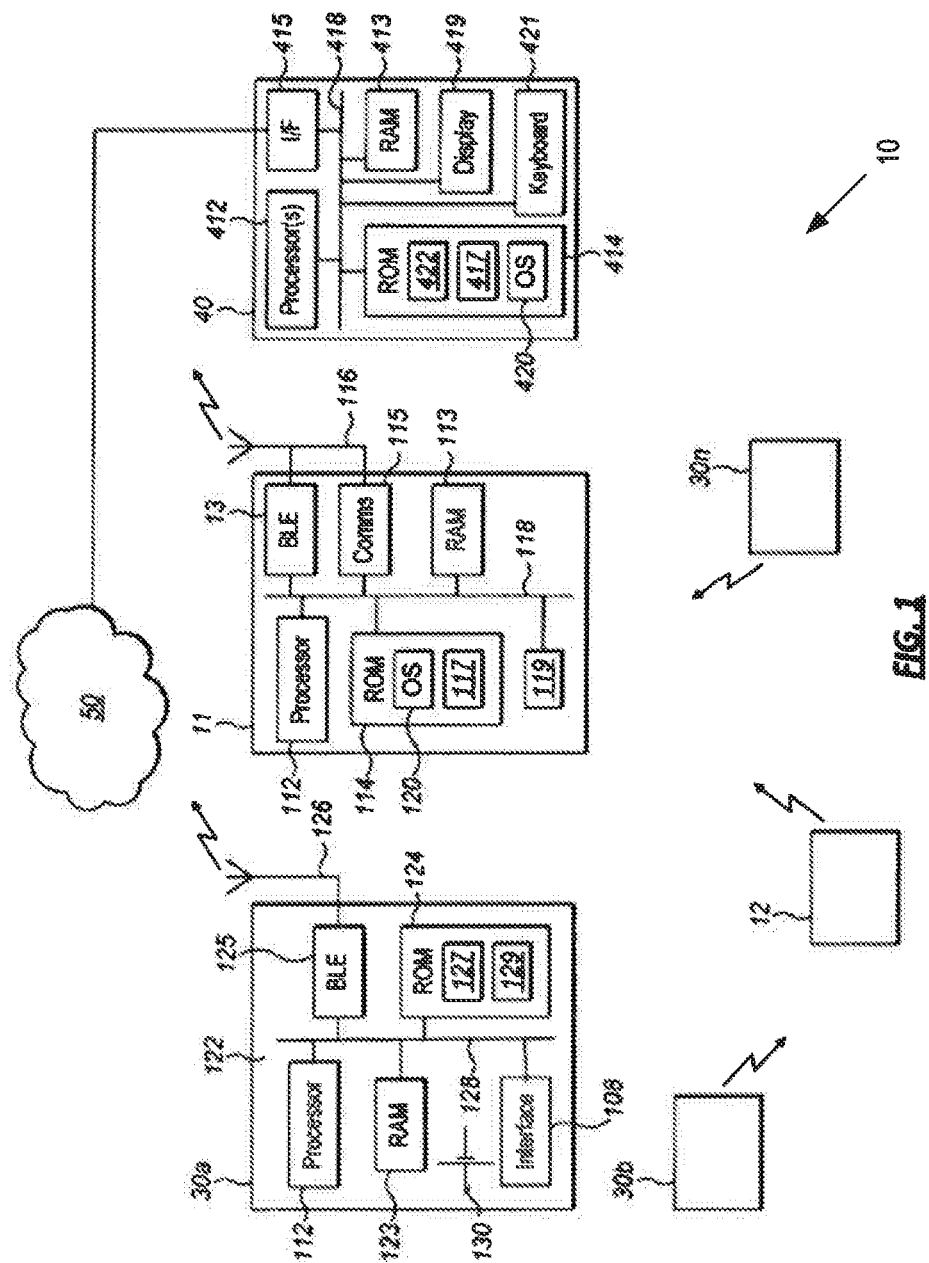
FIG. 1 is a schematic diagram of a system according to aspects of the invention including components according to aspects of the invention and operating according to aspects of the invention.

FIG. 1 shows a system according to embodiments of the invention. The system 10 includes a first device 11 and a second device 12. It also includes first to nth BLE beacons 30a, 30b to 30n, each of which may be referred to as a beacon 30. The system also includes a server 40. The first and second devices 11, 12 are mobile or portable and their locations can be tracked.

Briefly, the BLE beacons 30 are based at different locations within a building or complex of buildings and periodically transmit two different messages. These messages are, firstly, AoD positioning packets and, secondly, positioning advertisement messages. Both the AoD positioning messages and the positioning advertisement messages transmitted by a given beacon 30 include an identifier that is unique to that beacon 30 within the building.

Each of the BLE beacons 30 includes multiple antenna elements and transmits the AoD positioning packets including a certain packet tail called AoD extension. The beacon has multiple antenna elements which are used sequentially during the transmission of the AoD extension. The sequence of antenna elements involves switching between them in a pre-defined order. Each of the first and second devices 11, 12 is able to receive an AoD positioning packet from the BLE beacons 30 and calculate, from parameters of the received signal at the part corresponding to the AoD extension, a bearing from the beacon 30 at which the AoD positioning packet was received at the device 11, 12. The bearing is able to be calculated because of the form given to the signal transmitted along the bearing by the multiple antenna elements.

The positioning advertisement messages include information designating the location and orientation of the beacon 30. The location of the beacon can be given e.g. in Cartesian coordinates, Polar coordinates, Spherical coordinates or without coordinates (enabling positioning just relative to the beacon). The positioning advertisement messages may be sent from only a single element of the antenna 116. The positioning advertisement messages are received at the devices 11, 12.

Both AoD positioning packets and positioning advertisement messages are transmitted periodically, although the AoD positioning packets are transmitted more frequently.

The devices 11, 12 then can calculate their position using information designating the location and orientation of the beacon and the calculated bearing. Devices 11, 12 can calculate their locations having received an AoD positioning packet from one beacon with a reasonable degree of accuracy. Devices 11, 12 can calculate their locations with greater accuracy by triangulating information relating to AoD positioning packets received from two or more beacons, although the accuracy achieved using only one beacon typically is sufficient. Devices 11, 12 are able to calculate their location without network assistance.

The first device 11 includes a BLE module 13, which operates according to the BLE standard. Each of the BLE beacons 30 also includes a BLE module that operates according to the BLE standard.

The first device 11 includes a processor 112. The processor 112 is connected to volatile memory such as RAM 113 by a bus 118. The bus 118 also connects the processor 112 and the RAM 113 to non-volatile memory, such as ROM 114. A communications interface or module 115 is coupled to the bus 118, and thus also to the processor 112 and the memories 113, 114. A BLE module 13 is coupled to the bus 118, and thus also to the processor 112 and the memories 113, 114. An antenna 116 is coupled to the communications module 115 and the BLE module 13, although each may instead have its own antenna. Within the ROM 114 is stored a software application 117. The software application 117 in these embodiments is a navigation application, although it may take some other form. An operating system (OS) 120 also is stored in the ROM 114.

The first device 11 may take any suitable form. Generally speaking, the first device 11 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the first device 11.

The BLE module 13 may take any suitable form. Generally speaking, the BLE module 13 of the first device 11 may comprise processing circuitry, including one or more processors, and a storage device comprising a single memory unit or a plurality of memory units. The storage device may store computer program instructions that, when loaded into the processing circuitry, control the operation of the BLE module 13.

The first device 11 also comprises a number of components which are indicated together at 119. These components 119 may include any suitable combination of a display, a user input interface, other communication interfaces (e.g. WiFi, etc.), a speaker, a microphone, and a camera. The components 119 may be arranged in any suitable way.

The BLE module 13 includes a communication stack that is implemented at least partly in software using processor and memory resources (not shown), all of which are included within the BLE module 13. The BLE module 13 is configured, when enabled by the navigation application 117, to calculate the location of the host device 11 as described above, and to report the location to the navigation application 117.

The navigation application 117 is configured to control the BLE module 13 to switch between a positioning mode in which it calculates the position of the host device 11, 12 and a non-positioning mode in which it does not calculate the position of the host device 11, 12, as required by the navigation application 117.

The navigation application 117 may for instance control the BLE module to reside in the positioning mode when positioning has been enabled by the user or by the operating system 120 and when outdoor positioning (e.g. GPS) is unavailable, and to reside in the non-positioning mode otherwise. Alternatively, the navigation application 117 may for instance control the BLE module to reside in the positioning mode when positioning has been enabled by the user or by the operating system 120 and when BLE positioning advertisement messages have been received within a certain time period (e.g. 10 minutes before the current time), and to reside in the non-positioning mode otherwise.

The second device 12 may be configured and operate in the same way as the first device 11.

The devices 11, 12 may be mobile phones, smart phones, tablet computers, laptop computers, cameras, mp3-players, equipment integrated within vehicles, etc. The devices 11, 12 may be based around any suitable operating system, for instance the Symbian operating system or Microsoft Windows operating system, although any other operating system may instead be used. The devices 11, 12 may run different operating systems.

The beacon 30, for instance the first beacon 30*a*, includes a BLE module 125, an antenna 126, a source of power 130, a processor 112, RAM 123, ROM 124, software 127 and a bus 128 are constituted and connected in any suitable way. The antenna 126 is a multi-element antenna, as described below.

The ROM 124 of the beacon 30 also stores information 129. The information 129 includes an identifier that identifies the beacon, the model number of the beacon, the location of the beacon, and the orientation of the beacon.

The beacon 30 includes a communication interface 108, using which communications can be received from the server 40. The server 40 may be connected either directly or indirectly with the beacon 30. The server 40 may be connected with the beacon 30 by Ethernet.

The source of power 130 may be for instance a power-over-Ethernet source, a battery, or mains power. The source of power 130 powers the BLE module 121 and any other components of the beacon 30.

The BLE module 121 of the beacon 30 is both a transmitter and a receiver.

Each of the BLE beacons 30 includes multiple antenna elements (indicated together at 126 in the Figure) and transmits AoD positioning messages using these multiple antenna elements simultaneously. By transmitting the AoD positioning messages in this way, a device 11, 12 can calculate from parameters of the received signal that included the AoD positioning message an angle (actually, both azimuth and elevation angles) from the beacon 30 at which the device 11, 12 is located.

Each of the BLE beacons 30 also is configured to transmit information designating the location and orientation of the beacon 30. This information forms part of the positioning advertisement messages.

Using calibration data describing calibration of the multi-element antenna 126, devices 11, 12 can calculate their locations having received an AoD positioning packet from one beacon 30 with a reasonable degree of accuracy. Devices 11, 12 can calculate their locations with greater accuracy by triangulating or by combining location information relating to AoD positioning message received from two or more beacons, although the accuracy achieved using only one beacon typically is sufficient. As described below, devices 11, 12 may be able to calculate their location without network assistance.

Positioning advertisement messages may be transmitted by each beacon 30 periodically, for instance at 1 Hz (i second intervals) or 2 Hz (0.5 second intervals) or at intervals defined by some component within the system. They may alternatively be transmitted on request of some component within the system. In BLE, advertisement messages are called ADV_IND. Each includes a packet data unit (PDU), called an ADV_IND PDU. Response messages are called BCST_REQ. Each includes a packet data unit (PDU), called a BCST_REQ PDU. A device may respond to receiving an ADV_IND PDU by transmitting a response message BCST_REQ PDU, following which the beacon will transmit a response message BCST_RSP PDU.

In this specification, the terms 'message' and 'packet' are used interchangeably since they are intrinsically linked.

AoD positioning messages may be transmitted by each beacon 30 periodically, for instance at 20 Hz (so millisecond intervals). Clearly, devices 11, 12 can calculate their positions at the same periodicity, or the devices 11, 12 can filter multiple measurements for better accuracy. Such a frequency of transmission of AoD positioning messages allows rapid and reliable positioning updates for the devices 11, 12. In BLE, AoD positioning advertisement messages are called AoD_BCST_IND packets.

The beacon 30 may take any suitable form. Generally speaking, the beacon 30 may comprise processing circuitry, including one or more processors, and a storage device, comprising a single memory unit or a plurality of memory units. The storage device may store computer program instructions that, when loaded into the processing circuitry, control the operation of the beacon 30.

The other beacons 30b . . . 30n may be configured and operate in the same way as the first beacon 30a. The other beacons are different to the first beacon 30a at least in that the information 129 stored in the ROM 124 includes a different identifier and a different location, and may also include a different orientation of the beacon.

The server 40 includes a processor 412. The processor 412 is connected to volatile memory such as RAM 413 by a bus 418. The bus 418 also connects the processor 412 and the RAM 413 to non-volatile memory, such as ROM 414. A communications interface 415 is coupled to the bus 418, and thus also to the processor 412 and the memories 413, 414. The interface 415 is connected to the radio network 50 in any suitable way, for instance via the Internet or a local network. Within the ROM 414 is stored a software application 417. An operating system (OS) 420 also is stored in the ROM 414. Within the ROM 414 is also stored one or more sets of calibration data 422.

An output device such as a display 419 may be provided with the server 40. An input device such as a keyboard 421 may be provided with the server 40.

The server 40 may take any suitable form. Generally speaking, the server 40 may comprise processing circuitry 412, including one or more processors, and a storage device 414, 413, comprising a single memory unit or a plurality of memory units. The storage device 414, 413 may store computer program instructions that, when loaded into the processing circuitry 412, control the operation of the server 40.

Some further details of components and features and alternatives for them will now be described.

The computer program instructions 117 may provide the logic and routines that enables the first device 11 to perform the functionality described below. The computer program instructions 117 may be pre-programmed into the first device 11. Alternatively, they may arrive at the first device 11 via an electromagnetic carrier signal or be copied from a physical entity such as a computer program product, a non-volatile electronic memory device (e.g. flash memory) or a record medium such as a CD-ROM or DVD. They may for instance be downloaded to the first device 11 from a server, for instance the server 40 but possibly another server such as a server of an application marketplace or store.

The processing circuitry 112, 412 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 412 may be termed processing means.

Typically, the BLE modules 13, 121 each comprise a processor coupled connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BLE module 13, 125 may be a single integrated circuit. Each may alternatively be provided as a set of integrated circuits (i.e. a chipset). The BLE modules 13, 125 may alternatively be hardwired, application-specific integrated circuits (ASIC).

The communication interface 115 may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 712.11 (Wi-Fi). Alternatively or additionally, the communication interface 115 may be configured for wired communication with a device or network.

The apparatus 11, 12, 40, 30 may comprise further optional software components which are not described in this specification since they may not have direct interaction with the features described.

The BLE beacons 30 are distributed around a building or premises. For instance a first beacon 30a may be located in a canteen, a second beacon 30b may be located in a reception area, and so on. The first and second beacons 30a and 30b can be referred to as beacons 30. Beacons 30 do not need to provide complete coverage of a building, but advantageously are provided to provide good coverage of all key locations within the building.

It is possible in a HAIP system to have a flat array antenna 126 with P elements, with each element having two separate feeds for orthogonal polarisations. K channels are constructed to transmit or receive signal through the array antenna, where K=2*P+1. The factor of 2 is derived from there being two feeds with orthogonal polarisations per antenna element. The addition of 1 is included because one extra channel is constructed by combining the two different polarisations of a central element. Thus, a P=7 element antenna provides K=15 channels. In a P=7 element antenna, six elements may be arranged in a circle around a central antenna element.

To perform positioning function, a calibration matrix of the array antenna is firstly obtained by measurement in a test chamber.

By dividing the azimuth angle range 0~360 degree into M grids and the elevation angle range 0~90 degree into N grids, cross polarisation calibration source (vertical polarisation and horizontal polarisation) signals are recorded in every channel and at every azimuth and elevation angle grid. Each recorded signal is represented by I and Q values. Here, the calibration matrix is a four dimensional (4-D) matrix C[4][M][N][K]. The first dimension of this four-dimensional matrix has a size of 4, where the first two elements in the first dimension respectively represent I and Q values from the vertical polarised source and the following two elements in the first dimension respectively represent I and Q values from the horizontal polarised source. The four-dimensional matrix C[4][M][N][K] can be split into two three-dimensional matrices by representing each pair of real and imaginary data elements with one complex data element. The result is a three-dimensional matrix for the vertical polarised source, which can be represented as Cv[M][N][K], and a three-dimensional matrix for the horizontal polarised source, which can be represented as Ch[M][N][K]. In summary, the calibration matrix measurement is performed by recording array responses of all channels when signal are incident from all possible azimuth and elevation angles.

When performing positioning in mobile-centric mode, the signal is transmitted from the beacon 30 to the mobile devices 11, 12. A positioning algorithm running in the mobile device 11, 12 receives K channel signals and searches for the most likely K-dimension data in the calibration matrix. From this, the mobile device 11, 12 makes a decision as to which position in the azimuth and elevation grid the signal originates.

In mobile-centric positioning mode, the system works as an inverse like form of calibration matrix measurement. The array-antenna 126 broadcasts a continuous wave, which can be viewed as '1' in the baseband complex model before modulation, from each channel sequentially, in a particular switching pattern. The mobile device 11, 12 receives the signals emitted from all channels within a period of time. According to the reciprocal theory of radio wave propagation, the mobile device 11, 12 actually receives the response of all channels just like the recorded response in the chamber measurement. The positioning algorithm running within the mobile device 11, 12 performs correlation between the received signal vector and the calibration matrix.

It will be appreciated here that the calibration matrix has N*M signal vectors, which represent the array response from N*M azimuth-elevation angle pairs. Thus, N*M correlations are performed and from the most similar vector the corresponding azimuth-elevation angles pair can be found.

The calibration data can be substantial, typically of the order of a few Megabytes. A mobile device needs to obtain the calibration data for a multi-element antenna 126 only once, and this calibration data can then be used when positioning using signals received from beacons having the same multi-element antenna configuration.

There are a number of options for provisioning mobile devices with the calibration data. For some mobile devices, such as simple tags, configuring the tag with the calibration data during manufacture may be the best option. For more sophisticated devices, providing the calibration data on a server (e.g. the server 40) that the mobile device can access through cellular radio, Wi-Fi etc. may be the best option. BLE has very limited bandwidth, and communicating the calibration data using BLE would take many tens of seconds and thus would generally not be acceptable.

Embodiments of this invention provide a scheme whereby the calibration data can be provisioned to mobile devices using a low bandwidth resource, such as BLE, in a mobile-centric positioning system.

In brief, the embodiments involve compressing calibration data in a way that produces compressed calibration data that is particularly easy to decompress. Additionally, the compressed calibration data is provided in such a way that it can be transmitted in whole or in part, with part of the calibration data being useable in determining a bearing. In particular, the compression involves performing singular value decomposition (SVD) of a two-dimensional matrix, which is obtained by rearranging a three-dimensional calibration matrix, resizing the resulting matrices, and optionally quantising float data in the resized matrices. A few different examples of SVD and resizing are described below. Layers or dimensions of the resulting matrices are transmitted separately. A device can reconstruct the calibration matrix sufficiently to allow it to be used for bearing calculation using only one layer or dimension of the matrices. With further layers/dimensions, the calibration matrix can be more completely reconstructed, allowing more accurate bearing calculations. The compression ratio can be high, resulting in less data transmission, with very little loss in quality.

Compression of the calibration data may be performed by the beacon 30 or it may instead be performed within a network or infrastructure externally to the beacon 30, for instance by the server 40. Compression of the calibration data need only be performed once.

Operation of the beacon 30 or the server 40 in compressing calibration data will now be described with reference to FIG. 2.

Figure 2:
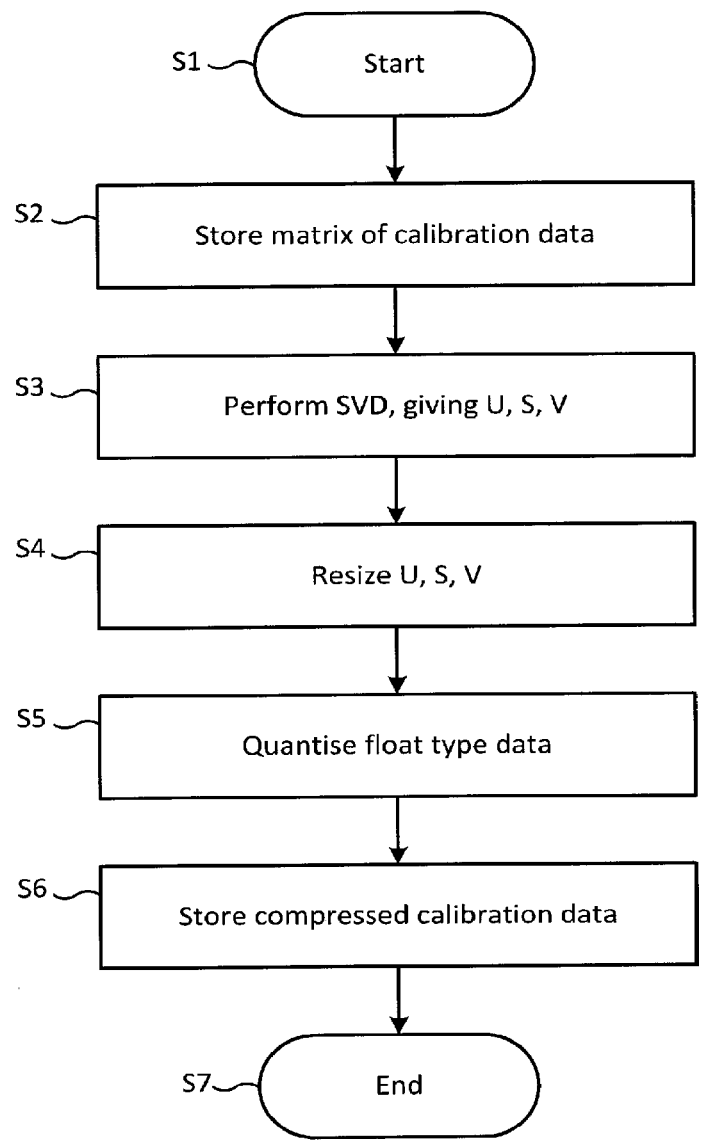
FIG. 2 is a flow chart illustrating operation of a server included in FIG. 1 according to embodiments of the invention.

FIG. 2 is described with reference to the server 40. The steps described are performed by the processor(s) 412 using the RAM 413 under control of the software application 417 stored in the ROM 414.

Here, the operation starts at step S1. At step S2, the server 40 stores the four-dimensional matrix of calibration data C[4][M][N][K] as two three dimensional matrices Cv[M][N][K] and Ch[M][N][K]. These matrices of calibration data have the form described above, and are stored in the ROM 414 as part of the sets of calibration data 422. As will be seen, the sets of calibration data 422 include the uncompressed three-dimensional matrices of calibration data as well as compressed calibration data.

At step S3, the server 40 performs singular value decomposition (SVD). The result is plural matrices, including at least one first unitary rotation matrix U, at least one diagonal scaling matrix S and at least one second unitary rotation matrix V. Some examples of this step are described below. In the following, the first unitary rotation matrix U, the diagonal scaling matrix S and the second unitary rotation matrix V may be referred to simply as U, S and V respectively.

At step S4, the server 40 resizes the matrices U, S and V resulting from step S3. Some examples of this step are described below. This step reduces the amount of data, i.e. it makes the calibration matrix data smaller in size. Without resizing, the amount of data would be increased instead of being reduced.

At step S5, the server 40 quantises float type data from the resized matrices resulting from step S4. The float type data is quantised into signed fixed point data. The signed fixed point data may for instance be 8 bit data, of which 1 bit is the sign and 7 bits is the magnitude. This step reduces the amount of data, i.e. it makes the calibration matrix data smaller in size. The size reduction depends on the nature of the float type data in the original matrices. For 32 bit float type data, the size reduction is a factor of four, i.e. the quantised data includes a fourth the number of bits of the pre-quantised data.

The quantising step S5 is in some embodiments performed prior to the resizing step S4.

The quantising step does not reduce the quality of the data significantly because the antenna response data (the calibration data) does not have as high a dynamic as is offered by float type data. The 8 bits signed integer resulting from the quantisation can handle almost all of the needed dynamic.

In other embodiments, the antenna response data (calibration data) is signed data, instead of float type data. In these embodiments, the quantising step can be omitted.

The quantised matrices resulting from step S5 are stored by the server 40 at step S6. The quantised matrices are stored as compressed calibration data in a set at 422 in the ROM 414 of the server.

The operation ends at step S7.

Three options for performing SVD at step S3 will now be described. In each case the result is plural matrices, including at least one first unitary rotation matrix U, at least one diagonal scaling matrix S and at least one second unitary rotation matrix V. To obtain the plural resulting matrices can be considered to form one or more larger matrices X, as is explained below.

In a first option, the server decomposes each of K two-dimensional matrices X[M][N] into matrices U, S, and V by SVD. The result X=U*S*W where matrix U has a size M-by-M; matrix S has a size M-by-N; and matrix V has a size N-by-N. The number of matrices X[M][N] is K. Each matrix X[M][N] is composed by the first and second dimensions of the matrix Cv[M][N][K] The same operation is applied to the other matrix Ch[M][N][K].

In a second option, the server 40 rearranges the calibration matrix Cv[M][N][K] to Cv[M][K][N] by exchanging or swapping the second and third dimensions [N] and [K]. The server 40 then decomposes each of N two-dimensional matrices X[M][K] into matrices U, S, and V by SVD. The result X=U*S*V where matrix U has a size M-by-M; matrix S has a size M-by-K; and matrix V has a size K-by-K. The number of matrices X[M][K] is N. Each matrix X[M][K] is composed by the first and second dimension of the matrix Cv[M][K][N] The same operation is applied to the other matrix Ch[M][N][K].

In a third option, the server rearranges the calibration matrix Cv[M][N][K] to X[N*K][M] by merging the second and third dimensions [N] and [K] into the first dimension of a new matrix X. The server 40 then decomposes the matrix X[N*K][M] into matrices U, S, and V by SVD. The result X=U*S*V where matrix U has a size N*K-by-N*K; matrix S has a size N*K-by-M; and matrix V has a size M-by-M. The number of matrices X[N*K][M] is 1, i.e. there is one matrix X The same operation is applied to the other matrix Ch[M][N][K].

Three options for resizing in step S4 will now be described. In each case, the result is smaller matrices U, S and V. In each case, it is the least important (most redundant) dimensions of the matrices that are omitted because of the nature of the resizing and because of the nature of SVD. In particular, those diagonal elements (singular values) of the diagonal scaling matrix S are ordered from largest to smallest, where the largest singular value is in the top-left corner. Considering the matrix multiplication rule, those matrix U columns which are closer to the right are less important, and those matrix V rows which are closer to the bottom are less important. This character results in the least important data being in the columns/rows that are discarded when resizing U, S and V.

In a first option, the server 40 performs the following steps. Firstly, for each channel between o and k (i.e. channels 0~k), the related U, S and V are produced as follows. The matrix U is reduced to size M-by-P by discarding columns other than the first P columns; the matrix S is reduced to size P-by-P by discarding rows and columns other than the first P rows and columns; and the matrix V is reduced to size P-by-N by discarding rows other than the first P rows. Secondly (although this could be performed firstly or in parallel with the other step), for channels k+1~K~1 the related U, S and V are produced as follows. The matrix U is reduced to size M-by-Q by discarding columns other than the first Q columns; the matrix S is reduced to size Q-by-Q by discarding rows and columns other than the first Q rows and columns; and the matrix V is reduced to size Q-by-N by discarding rows other than the first Q rows.

The first resizing option is used to process matrices resulting from the first option for performing SVD described above.

In a second option, the server 40 performs the following steps. Firstly, for those elevation angles in the range 0~n the related U, S and V are produced as follows. The matrix U is reduced to size M-by-P by discarding columns other than the first P columns; the matrix S is reduced to size P-by-P by discarding rows and columns other than the first P rows and columns; and the matrix V is reduced to size P-by-K by discarding rows other than the first P rows. Secondly (although this could be performed firstly or in parallel with the other step), for those elevation angles in the range n+1~N-1 the related U, S and V are produced as follows. The matrix U is reduced to size M-by-Q by discarding columns other than the first Q columns; the matrix S is reduced to size Q-by-Q by discarding rows and columns other than the first Q rows and columns; and the matrix V is reduced to size Q-by-N by discarding rows other than the first Q rows.

The second resizing option is used to process matrices resulting from the second option for performing SVD described above.

In a third option, the server 40 performs the following steps. The matrix U is reduced to size N*K-by-P by discarding columns other than the first P columns; the matrix S is reduced to size P-by-P by discarding rows and columns other than the first P rows and columns; and the matrix V is reduced to size P-by-M by discarding rows other than the first P rows.

The third resizing option is used to process matrices resulting from the third option for performing SVD described above.

Generally speaking, the server 40 performs resizing of the first unitary rotation matrix U by discarding one or more columns of the first unitary rotation matrix U. In the first and second options, the server 40 performs resizing of some of the first unitary rotation matrix U by keeping the first P columns and discarding other columns of the first unitary rotation matrix U.

Generally speaking, the server 40 performs resizing of the diagonal scaling matrix S by discarding one or more columns and one or more rows of the diagonal scaling matrix S. In the first and second options, the server 40 performs resizing of some of the diagonal scaling matrix S by keeping the first Q rows and the first Q columns and discarding other columns and rows of the diagonal scaling matrix S.

Generally speaking, the server 40 performs resizing of the second unitary rotation matrix V by discarding one or more rows of the second unitary rotation matrix V. In the first and second options, the server 40 performs resizing of some of the second unitary rotation matrix V by keeping the first Q rows and discarding other rows of the second unitary rotation matrix V.

Generally speaking, the server 40 performs resizing of at least some of each of the first unitary rotation matrix U, the diagonal scaling matrix S and the second unitary rotation matrix V by discarding one or more columns of the first unitary rotation matrix U, discarding one or more columns and one or more rows of the diagonal scaling matrix S and discarding one or more rows of the second unitary rotation matrix V.

The result of the operation of FIG. 2 is calibration data that has been compressed in a certain way stored in memory. In the case of the server 40 performing the compression operation, the compressed calibration data is stored in a memory (the ROM 414) of the server 40. Afterwards, the compressed calibration data is communicated to and stored in each of the beacons 30 having the antenna configuration to which the calibration data relates. The compressed calibration data is stored in these embodiments in the information part 129 of the ROM 124 of the appropriate beacons 30. Thus, the beacons 30 are provided with the compressed calibration data that indicates the characteristics of the antenna 126 included within the beacon. If the beacon 30 performs the compression operation of FIG. 2, the compressed calibration data immediately resides in the beacon 30, in particular in the ROM 124.

Figure 3:
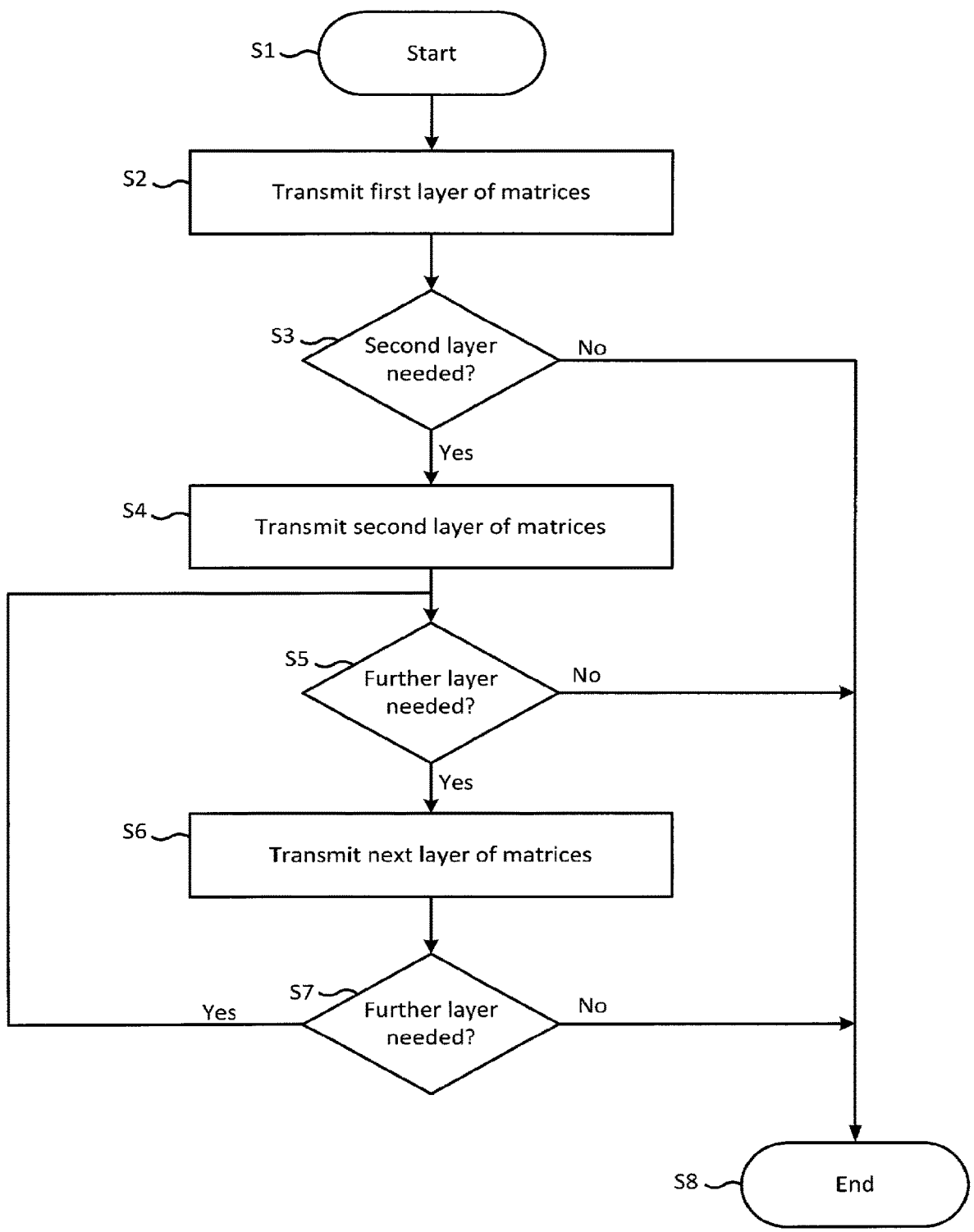
FIG. 3 is a flow chart illustrating operation of a beacon of FIG. 1 according to embodiments of the invention.

Operation of the beacon 30 in transmitting compressed calibration data to a mobile device 11, 12 will now be described with reference to FIG. 3. The steps described are performed by the processor 122 using the RAM 123 under control of the software application 127 stored in the ROM 124. Transmission involves the BLE module 125 and the antenna 126, or at least one element of the antenna 126.

Operation starts at step S1. At step S2, the beacon 30 transmits the first layer/dimension of the matrices that comprise the compressed calibration data. A layer can also be termed a dimension, and the two terms can be used interchangeably. The first layer/dimension of the matrix U is the first column of the matrix U. The first layer/dimension of the matrix S is the first element in the diagonal of the matrix S. The diagonal here starts at the top left corner of the matrix (x=1, y=1) and extends downwards and to the right (incrementing x and y). The first element in the diagonal is at the start position of the diagonal. The first layer/dimension of the matrix V is the first row of the matrix V. Step S2 involves transmitting the first layer/dimension of the matrices and also data indicating that it is the first layer/dimension of the matrices that is being transmitted. This can be performed in any suitable way, for instance by signalling in a packet header.

It is then determined at step S3 whether it is required to transmit a second layer/dimension of the compressed calibration data. This may involve determining whether a request for the second layer/dimension has been received from the mobile device 11, 12, or whether the mobile device has indicated that no further layers/dimensions are needed (a negative request). The beacon 30 may assume that a second layer/dimension is required to be transmitted and proceed unless instructed otherwise. The beacon 30 may alternatively determine that a second layer/dimension is needed when it is determined from signals received from the mobile device 11, 12 that the mobile device has fully received the first layer/dimension of the compressed calibration data.

On a positive determination from step S3, the operation proceeds to step S4. On a negative determination, the operation ends at step S8.

At step S4, the beacon 30 transmits the second layer/dimension of the matrices that comprise the compressed calibration data. The second layer/dimension of the matrix U is the second column of the matrix U. The second layer/dimension of the matrix S is the second element in the diagonal of the matrix S. The second layer/dimension of the matrix V is the second row of the matrix V. Step S4 involves transmitting the second layer/dimension of the matrices and also data indicating that it is the second layer/dimension of the matrices that is being transmitted. This can be performed in any suitable way, for instance by signalling in a packet header.

It is then determined at step S5 whether it is required to transmit a further layer/dimension of the compressed calibration data. This may involve determining whether a request for the further layer/dimension has been received from the mobile device 11, 12, or whether the mobile device has indicated that no further layers/dimensions are needed (a negative request). The beacon 30 may assume that a further layer/dimension is required to be transmitted and proceed unless instructed otherwise. The beacon 30 may alternatively determine that a further layer/dimension is needed when it is determined from signals received from the mobile device 11, 12 that the mobile device has fully received the previous (second or subsequent) layer/dimension of the compressed calibration data.

On a positive determination from step S5, the operation proceeds to step S6. On a negative determination, the operation ends at step S8.

At step S6, the beacon 30 transmits the next layer/dimension of the matrices that comprise the compressed calibration data. The next layer/dimension of the matrix U is the column of the matrix U that immediately succeeds the previously transmitted layer. The next layer/dimension of the matrix S is the next element in the diagonal of the matrix S. The next layer/dimension of the matrix V is the row of the matrix V that immediately succeeds the previously transmitted layer.

After step S6, it is determined at step S7 whether further layers/dimensions remain to be transmitted. This typically involves determining whether a predetermined number of layers/dimensions have been transmitted already. On a positive determination, so when one or more further layers/dimensions remain to be transmitted, the operation returns to step S5. On a negative determination, so when no further layers/dimensions remain, the operation ends at step S8.

For the best quality reconstruction of the uncompressed data, the predetermined number of layers/dimensions is equal to the largest of P and Q, so that all of the compressed calibration data is transmitted to the mobile device 11, 12. The lower the number of layers/dimensions that are transmitted, the less accurate the bearing calculation that can be performed by the mobile device 11, 12 using the compressed calibration data.

As discussed below, the predetermined number of layers/dimensions used in step S7 may be three.

The transmission of the layers/dimensions of compressed calibration data from the beacon 30 to the mobile device 11, 12 may be performed in any suitable way. The layers/dimensions may be broadcast, so that they can be received by multiple devices 11, 12 simultaneously, or they may be addressed to the target mobile device. In the latter case, the layers/dimensions may be transmitted as part of a connection session between the beacon 30 and the mobile device 11, 12. In either case, the layers/dimensions are transmitted separately. That is, the first layer/dimension is transmitted separately to the second layer/dimension, and so on. Also, the layers/dimensions are transmitted in sequence. That is, transmission of the second layer/dimension is not commenced until transmission of the first layer/dimension has completed, and so on.

Operation of the mobile device 11, 12 in handling compressed calibration data will now be described with reference to FIG. 4. The steps described are performed by the processor 112 using the RAM 113 under control of the software application 117 stored in the ROM 114. Reception involves the BLE module 125 and the antenna 126. This operation may be performed in parallel with other operations within the mobile device 11, 12.

Operation starts at step S1. At step S2, the mobile device 11,12 receives the first layer/dimension of the matrices from the beacon 30. This is the first layer/dimension transmitted at step S2 of FIG. 2. The mobile device 11,12 converts the signed fixed point data in the received layer/dimension of matrices into float type data and stores the result in memory, e.g. the ROM 124.

At steps S3 and S4, the mobile device 11, 12 reconstructs the uncompressed calibration matrix to the extent possible with the received data.

Firstly, at step S3 the mobile device 11, 12 includes the float type data into blank (empty or zeroed) U, S and V matrices of the appropriate sizes. The sizes may be known by the mobile device 11, 12 by being pre-programmed with this information, by decoding this information from signalling in the transmissions of the beacon 30, or by inferring it from the length parameters of the received data. The mobile device 11, 12 does not resize the populated U, S and V matrices with additional rows, columns or rows and columns, and as such the sizes of the matrices remain the sizes of the matrices following resizing in the server 40.

Secondly, at step S4, the mobile device performs matrices multiplication (matrices multiplication is the same thing as reverse SVD) from the current received layer of U, S and V to generate a coarse uncompressed calibration matrix X1 by multiplying the received one-dimensional layer/dimension of U, S and V. The result is: X1=U*S*V, where the size of U is M-by-1 (for option 1 or option 2) or N*K-by-1 (for option 3); the size of S is 1-by-1 (for all options); and the size of V is 1-by-N (option 1) or 1-by-K (option 2) or 1-by-M (option 3).

The result X1 is an uncompressed calibration data matrix of the same dimensions as the pre-SVD matrices X from step S3 of FIG. 2 (i.e. for option 1, size of X is M*N, and there are K matrices of X; for option 2, size of X is M*K, and there are N matrices of X; for option 3, size of X is (N*K)*M, and there is only one matrix of X). The data in the calibration matrix is not the same, though, as much of the content is lost in the compression and decompression processes. It is for this reason that the matrix X1 can be called 'coarse'.

The resulting calibration data matrix can be used by the mobile device 11, 12 in calculating a bearing to the mobile device 11, 12 from a beacon 30 when the beacon transmits a positioning packet. Using the calibration data to calculate the bearing involves identifying a maximum correlation.

There is a difference in the accuracy of bearing calculation dependent on the data in the calibration data matrix. However, the compression technique used (as described with reference to FIG. 2) is such that the accuracy is reduced by a relatively small amount. Certainly the reduction in accuracy is far lower than the reduction in size of the data transmitted versus the size of the uncompressed calibration data matrix. More detail on this is provided later in this specification.

After the mobile device 11, 12 reconstructs the uncompressed calibration matrix at step S3, it receives the next layer/dimension of matrices at step S5. The mobile device 11, 12 converts the signed fixed point data in the latest received layer/dimension of matrices into float type data and stores the result in memory, e.g. the ROM 124. Alternatively, step S5 can be performed in parallel with steps S3 and S4.

Step S5 is similar to step S2, although the data is different and the mobile device 11, 12 can determine that the data relates to a different layer/dimension. On first performance of step S5, the next layer/dimension is the second layer/dimension, on the second performance it is the third layer/dimension, and so on.

At steps S6 and S7, the mobile device 11, 12 uses the latest layer/dimension of matrices to produce the current layer-specific coarse reconstruction of the uncompressed calibration matrix.

Firstly, at step S6 the mobile device 11, 12 includes the float type data into the appropriate positions within the populated U, S and V matrices provided by S3.

Secondly, at step S7, the mobile device performs matrices multiplication from the current received layer of U, S and V to generate a coarse uncompressed calibration matrix X2 by multiplying the received one-dimensional layer/dimension of U, S and V: X2=U*S*V, where the size of U is M-by-1 (for option 1 or option 2) or N*K-by-1 (for option 3); the size of S is 1-by-1 (for all options); and the size of V is 1-by-N (for option 1) or 1-by-K (for option 2) or 1-by-M (for option 3).

Next, at step S8 the resulting matrix X2 is combined with the corresponding matrix X1 from step S4.

The result of step S8 is an uncompressed calibration data matrix can be used by the mobile device 11, 12 in calculating a bearing to the mobile device 11, 12 from a beacon 30 when the beacon transmits a positioning packet. Because the calibration data matrix is formed from more layers/dimensions of compressed calibration data (put another way, because it is less coarse), the accuracy of bearing calculation resulting from use of the calibration data matrix is higher.

At step S9, the mobile device 11, 12 determines whether more layers/dimensions of compressed calibration data are to be received. This typically involves determining whether a predetermined number of layers/dimensions have been received already. On a positive determination, so when one or more further layers/dimensions remain to be received, the operation returns to step S5. On a negative determination, so when no further layers/dimensions remain, the operation ends at step S10.

Figure 4:
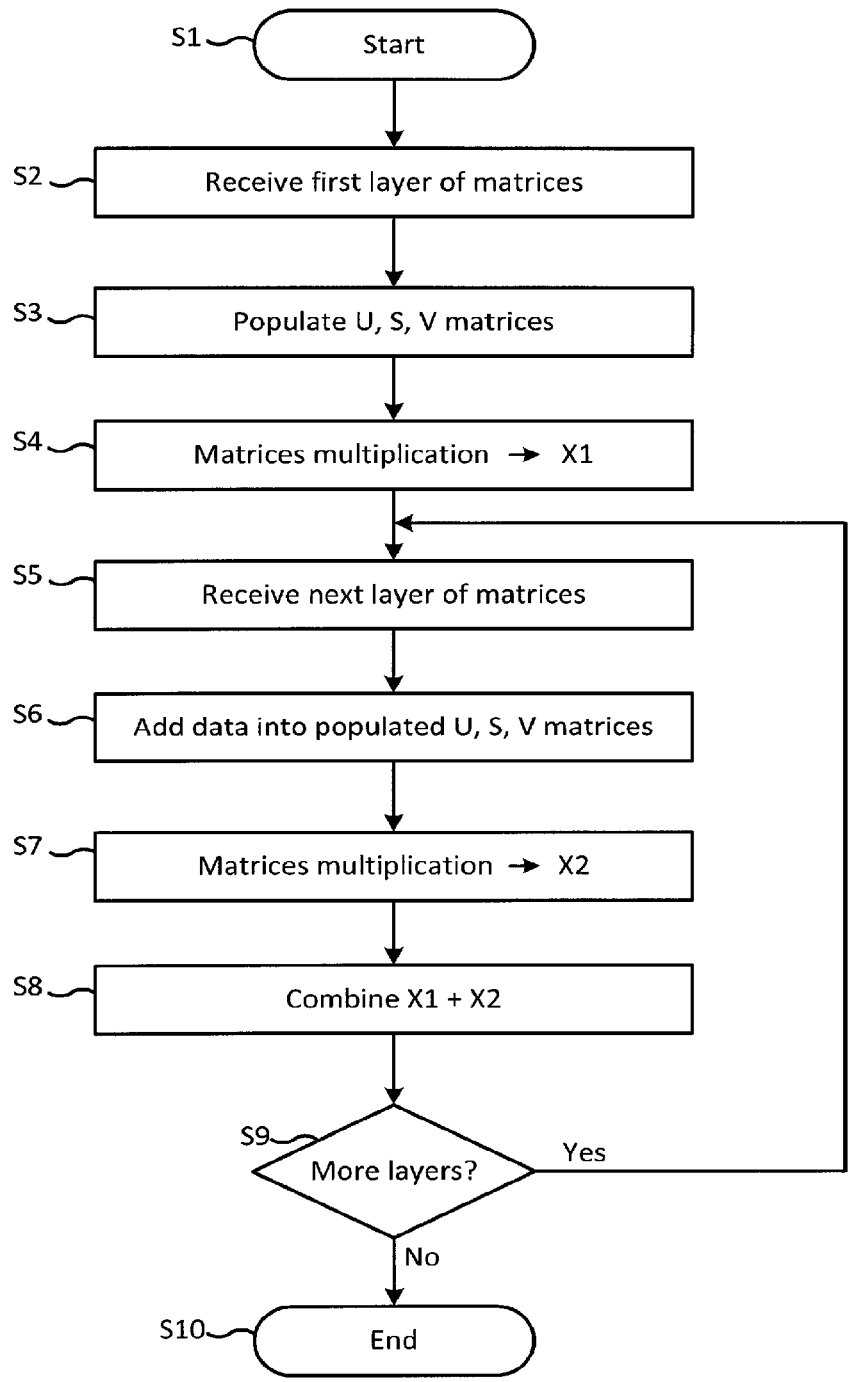
FIG. 4 is a flow chart illustrating operation of a mobile device included in the system of FIG. 1 according to embodiments of the invention.

When the operation of FIG. 4 loops back to process more layers, step S8 involves combining the matrices X that resulted from each previous matrices multiplication operation step S4, S7.

The predetermined number of layers/dimensions used in step S9 may be three. It has been found that this produces good results whilst resulting in a small size for the transmitted compressed calibration data.

For best receiver operation, the predetermined number of layers/dimensions is equal to the largest of P and Q, so that all of the layer specific matrices are combined in S8 of FIG. 4: X1+X2+X3+ . . . to reconstruct an accurate uncompressed calibration matrix. The higher the number of layers/dimensions that are received, the more accurate is the bearing calculation performed by the mobile device 11, 12 using the decompressed calibration data. However, as will be seen, the increase in performance for additional layers/dimensions can be relatively small. The improvement in performance as the number of layers/dimensions increases can be described as progressive performance.

In operation, a mobile device 11, 12 starts performing bearing calculations based on received positioning packets as soon as a calibration data matrix has been reconstructed from the first layer/dimension of compressed calibration data. When the second layer/dimension of compressed calibration data is used to improve the decompressed calibration data matrix, bearing calculations using the improved calibration data matrix are more accurate. Bearing calculations are made by the mobile device 11, 12 using this calibration data matrix until another layer/dimension of compressed calibration data is incorporated into the decompressed calibration data matrix, further improving it and allowing even more accurate bearings to be calculated. Bearings calculations are performed by the mobile device 11, 12 as and when required, using the latest available version of decompressed calibration data matrix that is available at that time.

Unless all layers of the matrix X have been transmitted and received at the mobile device 11, 12, the matrix X has not been reconstructed to the highest accuracy at the time of using it to search for a maximum correlation. However, this layer-by-layer refined positioning allows devices to obtain coarse bearing calculations (and thus their coarse position) quickly and to refine their position as more layers are received.

Once all of the layers of calibration data have been received, there are two options for storing the calibration matrix X.

The first option is to store the reconstructed calibration matrix X in memory (for example, number of elements is M*N) and discard all of the U, S and V matrices. With this option, bearing calculation can be performed without any further processing of the calibration data. However, the memory utilisation is relatively high.

The second option is not to store the reconstructed calibration matrix X in memory (for example, number of elements is M*N) but instead store all of the U, S and V matrices in memory. With this option, bearing calculation cannot be performed without firstly processing of the calibration data (the calibration data matrix X needs to be reconstructed in some form. However, the memory utilisation is relatively low because the size of the U, S and V matrices is less than the size of the reconstructed calibration matrix X.

The computational complexity of an exhaustive search for a maximum correlation in the mobile device 11, 12 can be reduced by firstly performing a coarse search and then using the results of the coarse search to focus a fine search for the maximum correlation.

In the above discussions of processing calibration data, one three-dimensional matrix is discussed. However, there are two such three-dimensional matrices in these embodiments, Cv and Ch, together forming a four-dimensional matrix where the fourth dimension has a magnitude of two. Each of the two three-dimensional matrices is handled in parallel but substantially simultaneously. The data for a layer/dimension of compressed calibration data includes data for each of Cv and Ch.

There are a number of advantages of the above-described features, and some will now be described.

The compression technique used does not require complicated or processor-intensive decompression at the mobile device 11, 12. Instead, only reduced matrix multiplication and accumulation (MAC) operations are needed to perform decompression of the calibration data matrix.

The compression technique is advantageous as regards network/infrastructure operation also. In particular, the compression needs to be performed only once. Storage of the compressed calibration data matrices in U, S and V with multiple layers/dimensions is straightforward for beacons 30 as well as for other elements of the network, for instance the server 40.

The feature of layered transmission and reconstruction/decompression allows a decompressed calibration data matrix to be constructed quickly by a receiver whilst allowing the accuracy of bearing calculations to be increased as more layers/dimensions are received and incorporated into the decompressed calibration data matrix.

The compression ratio provided can be high with a relatively low reduction in bearing accuracy (high reconstruction quality).

The high compression ratio results in a reduced time to transmit the calibration data, which in turn allows a mobile device to perform bearing calculations quickly. A high compression ratio also reduces bandwidth utilisation and power consumption.

The resizing of matrices during compression and the fact that the matrix does not need to be reconstructed into its original (pre-resizing) form in the mobile device 11, 12 means that less memory is required in the mobile device 11, 12 in order to store the calibration data. In particular, the total size of the resized matrices U, S and V is smaller than the size of the pre-SVD matrix X in step S3 of FIG. 2.

Some specific examples will now be described with reference to tests that have been performed.

Taking a calibration and antenna configuration of M=180, N=46, and K=15 as an example, concrete compression steps and results are as follows.

In a first test, the first SVD option and the first resizing option described above with reference to FIG. 2 were used.

K=15 two-dimensional matrices X[M][N] were created from the calibration matrix Cv[M][N][K] or Ch[M][N][K] using code based on the following pseudocode:

```
For k=0:
    For n=0:N-1
        For m=0:M-1
            X[m][n] = C[m][n][k];
        End for m
    End for n
```

Repeat for the other 14 X[M][N] matrices by setting k=1~14.

Next, each of the 15 two-dimensional matrices X[M][N] were decomposed into matrices U, S, and V by SVD, resulting in X=U*S*V where U is M-by-M; S is M-by-N; and V is N-by-N.

For channels 0~2 the related U, S and V, U was reduced to M-by-1 by discarding columns other than the first 1 column; S was reduced to 1-by-1 by discarding rows and columns other than the first 1 row and first i column; V was reduced to 1-by-N by discarding rows other than the first 1 row.

For channel 3~14 the related U, S and V, U was reduced to M-by-3 by discarding columns other than the first 3 columns; S was reduced to 3-by-3 by discarding rows and columns other than the first 3 rows and columns (S is diagonal matrix, elements other than diagonal are zeros); and V was reduced to 3-by-N by discarding rows other than the first 3 rows.

Thus the number of total elements in U S and V are 3*(180*1+1+1*46)+12*(180*3+3+3*46)=8,853, which is much smaller than the number of elements in matrix X, namely 180*46*15=124,200.

Then the float type data in matrices U, S and V was quantised into signed fixed point data, in this example 8 bit data. To do this, firstly the maximum absolute value among all elements in U S and V was found. The maximum absolute value is denoted as A. Next, the scale value G was calculated as: G=((2^(numbits-1))−1)/A, where numbits=8. Then, each element was processed by: element=element*G. Lastly, forced type conversion in C language was used to convert each element from float to an 8 bit signed integer. It will be appreciated that another float to fixed point quantisation method could be used instead The first layer/dimension of matrices U, S and V were transmitted, then the second layer/dimension, then the following layer/dimension. The dimensions are as described above In this example, in each layer/dimension transmission, the size of the transmitted U, S and V matrices are 180-by-1, 1-by-1 and 1-by-46 respectively.

The mobile device 11, 12 converted the received fixed point data to float type data by a reverse procedure of the conversion described above.

After receiving one layer/dimension of the matrices U, S and V, the mobile device 11, 12 reconstructed the calibration matrix from the received U*S*V layers/dimensions. The quality of this reconstructed calibration matrix was then assessed.

Next the mobile device 11, 12 received the second layer/dimension of the matrices U, S and V, and reconstructed a calibration matrix from the second U*S*V layers/dimensions. The mobile device 11, 12 then combined the current reconstructed calibration matrix with the reconstructed calibration matrix that was produced from the first layer/dimension alone. For the example of matrices: U is 180-by-1, S is 1-by-1 and V is 1-by-46, the matrices are combined by performing matrix addition X=X+Y, where X is 180-by-46 calibration matrix which was reconstructed from the first received layer/dimension and Y is the 180-by-46 calibration matrix which was reconstructed from the second received layer. The mobile device then 11, 12 obtained the latest reconstructed calibration matrix X. The quality of this reconstructed calibration matrix was then assessed.

Next the mobile device 11, 12 received the third layer/dimension of the matrices U, S and V, and reconstructed a calibration matrix from the third U*S*V layers/dimensions. The mobile device 11, 12 then combined the current reconstructed calibration matrix with the reconstructed calibration matrix that was produced from the first and second layers/dimensions by performing matrix addition X=X+Y, where X is 180-by-46 calibration matrix which was reconstructed from the first and second layers/dimensions and Y is the 180-by-46 calibration matrix which was reconstructed from the third received layer. The mobile device then 11, 12 obtained the latest reconstructed calibration matrix X. The quality of this reconstructed calibration matrix was then assessed.

Figure 5:
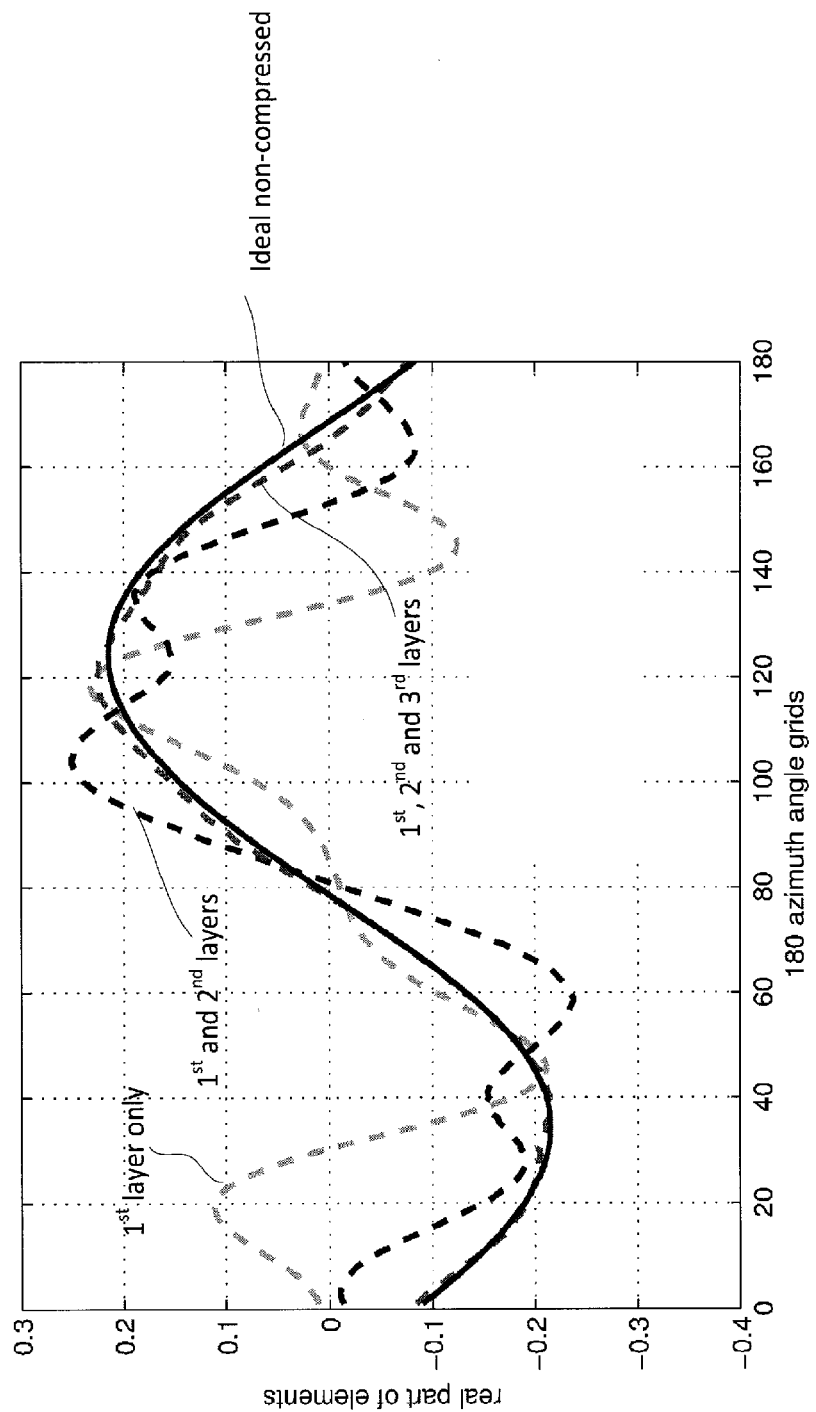
FIG. 5 is a diagram illustrating reconstruction quality resulting from a performed test.

FIG. 5 depicts progressive reconstructing of the real part of a first column of 180-by-46 calibration matrix of channel number 12. This Figure shows that reconstruction quality is very good (near the ideal) when three layers/dimensions are used in the reconstruction, and that quality is sufficient for some use when only one or two layers/dimensions are used, with quality for two layers/dimensions being better than for one.

To evaluate overall reconstruction quality of the calibration matrix Cv[M][N][K] or Ch [M][N][K], the reconstructed matrix is represented as D[M][N][K]. For each m and n pair (indices pair of $1^{st}$ dimension and $2^{nd}$ dimensions), all 15 elements were put in the $3^{rd}$ dimension of C[M][N][K] and D[M][N][K] into vector Cv and Dv. Then we can calculate all 180*46 (M*N) correlation coefficients between the vector Cv from original matrix and Dv from the reconstructed matrix. The closer the correlation coefficient is to 1 (unity), the higher the quality.

Figure 6:
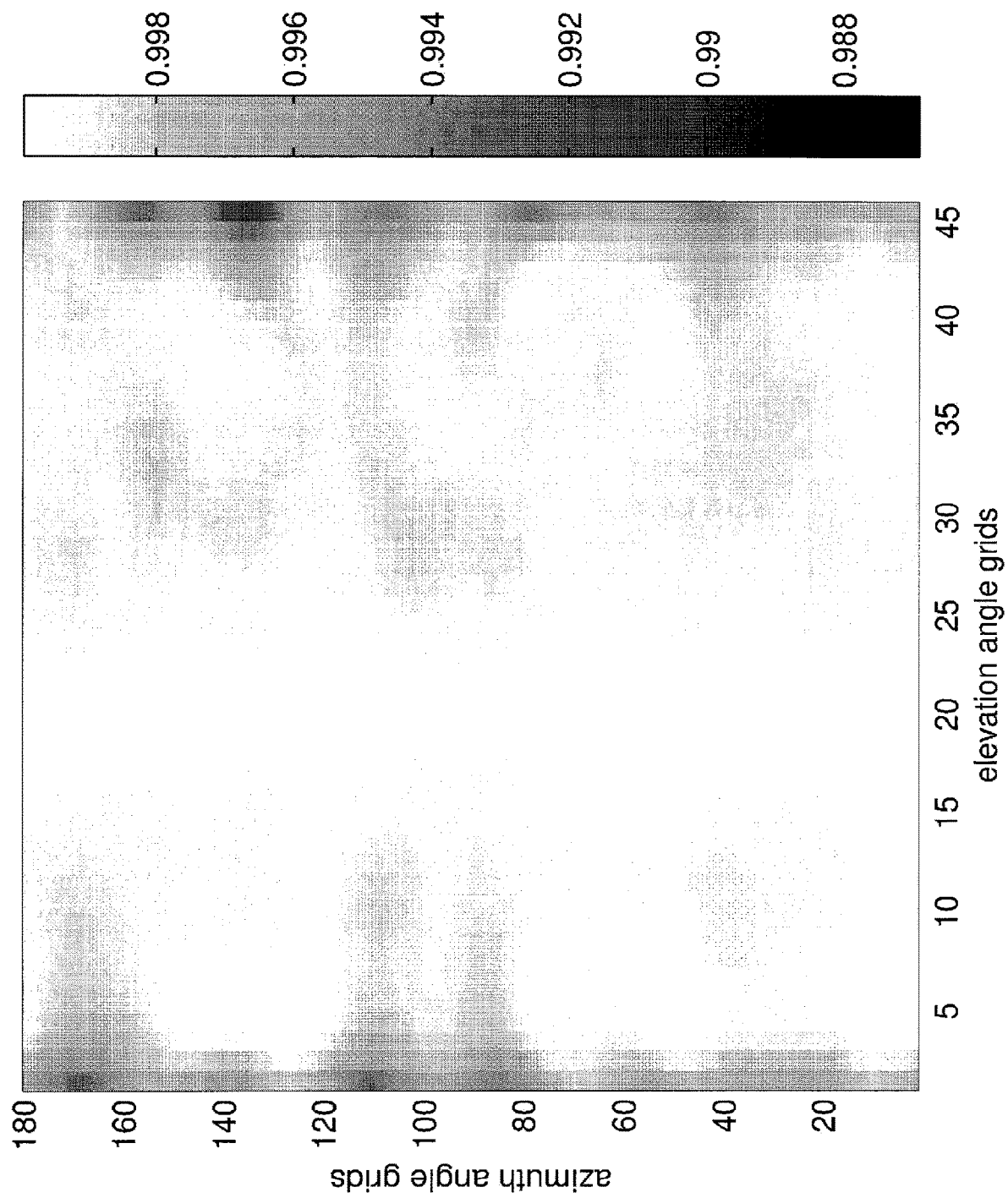
FIG. 6 is an illustration of correlation coefficients between original calibration matrix and reconstructed calibration matrix for different combinations of azimuth and elevation angles.
Figure 7:
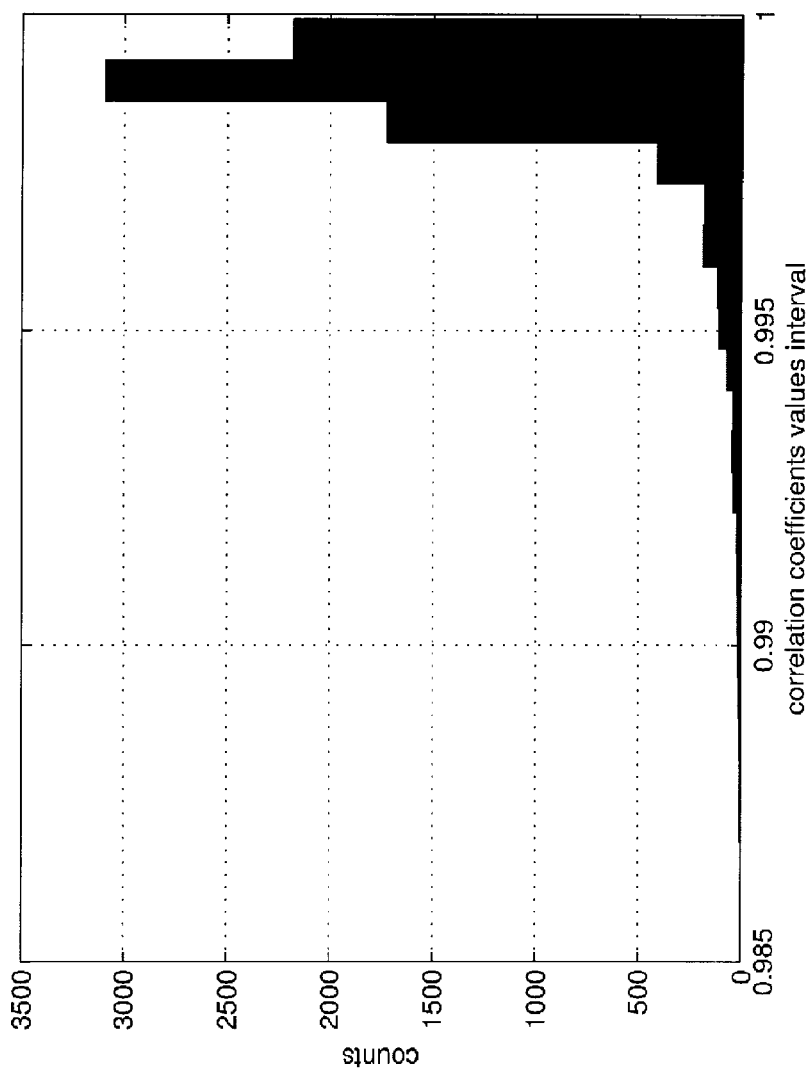
FIG. 7 is a count of correlation coefficients from FIG. 6.

FIG. 6 is an illustration of correlation coefficients for different combinations of azimuth and elevation angles. FIG. 7 is a count of correlation coefficients from FIG. 6. FIG. 7 shows that almost all the correlation coefficients are larger than 0.99.

With this high reconstruction quality, the overall compression ratio is 56.12 (calculated as 4*180*46*15/(3*(180*1+1+1*46)+12*(180*3+3 +3*46))—the first factor 4 in this equation comes from quantisation from type of 32 bit float to type of 8 bit fixed point). With this compression ratio, a 19,87,200 bytes calibration data matrix file becomes 35,412 bytes when compressed.

In a second test, the second SVD option and the second resizing option were used. In this example, optimised parameters are: n=20; P=9; Q=10. The resulting compression ratio is 5.77 (calculated as 4*180*46*15/(21*(180*9+9+9*15)+25*(180*10+10+10*15))).

In a third test, the third SVD option and the third resizing option were used. In this example, optimised parameters are: P=11. The resulting compression ratio is 51.85 (calculated as 4*180*46*15/(46*15*11+11+11*180)).

In summary, for the first option a compression ratio of about 56 was achieved, about 52 was achieved for the third option and about 6 for the second option. The first and third options provide high compression ratios whilst maintaining very high reconstruction quality.

The computational complexity of performing SVD of an m-by-n matrix is O(n^3). For a typical case where M=180, N=46, and K=15, the second option has the lowest complexity, the first option has a moderate complexity, and the third option has the highest complexity.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of alternatives will now be described.

Different sets of calibration data may be identified by a version number. The version number may be part of the antenna type identifier, which is transmitted in advertising packets in parallel with the positioning packets. In this way, the positioning packets may not need to be provided with a version number or other data identifying the calibration data set.

The positioning advertisement messages may be transmitted on BLE advertising channels, or the information communicated to the mobile devices 11, 12 in the positioning advertisement messages may be communicated in some other way. For instance, the positioning advertisement messages may be broadcast on one or more BLE data channels, for instance in SCAN_RSP containers.

Indeed, the invention is not limited to BLE. It will be appreciated that the concept underlying the above-described embodiments, as defined in the claims, is applicable to other systems in which the same considerations (e.g. limited bandwidth, positioning resolution etc.) are applicable. Other systems to which the invention may be applied and which are intended to be covered by the claims include unidirectional and bidirectional systems both present and future. Systems to which the invention may be applied include WiFi systems, pseudolite-based systems and such like.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. A method of providing antenna array calibration data of a base station to mobile devices using a wireless carrier in a mobile-centric positioning system, the method comprising:
    storing at least one three-dimensional matrix C[M][N][K] of calibration data, wherein [M] is a matrix of azimuthal angle of departure of a signal from the base station and having a range between 0 and 360 degrees, [N] is a matrix of elevation angle of departure of the signal from the base station and having a range between 0 and 90 degrees, and [K] is a matrix of channels for transmitting or receiving orthogonal polarisation signals through an array antenna of the base station;
    performing singular value decomposition of each of the at least one three-dimensional matrix C [M] [N] [K] of calibration data to produce at least one first unitary rotation matrix U, at least one diagonal scaling matrix S and at least one second unitary rotation matrix V;
    resizing each of the at least one first unitary rotation matrix U, the at least one diagonal scaling matrix S and the at least one second unitary rotation matrix V by removing dimensions therefrom, thereby producing resized matrices U, S and V;
    causing transmission of a first layer of each of the resized matrices U, S and V;
    determining whether or not a second layer of the resized matrices U, S and V is needed;
    on a negative determination, refraining from transmitting the second layer of the resized matrices U, S and V; and
    on a positive determination, causing transmission of the second layer of each of the resized matrices U, S and V subsequent to and separately from transmitting the first layers of the resized matrices U, S and V.

2. A method as claimed in claim 1, further comprising:
    determining whether or not a third layer of the resized matrices U, S and V is needed;
    on a negative determination, refraining from transmitting the third layer of the resized matrices U, S and V; and
    on a positive determination, causing transmission of the third layer of each of the resized matrices U, S and V subsequent to and separately from transmitting the second layers of the resized matrices U, S and V.

3. A method as claimed in claim 1, wherein the step of performing singular value decomposition of each of the at least one three-dimensional matrix C [M] [N] [K] of calibration data to produce the at least one first unitary rotation matrix U, the at least one diagonal scaling matrix S and the at least one second unitary rotation matrix V comprises:
    decomposing each of K 2-D matrices X[M][N] into matrices U, S, and V by singular value decomposition to provide the resized first unitary rotation matrices U of size M-by-M, the resized diagonal scaling matrices S of size M-by-N, and the resized second unitary rotation matrices V of size N-by-N, wherein K matrices X[M][N] are provided and wherein each matrix X[M][N] is composed by the first and second dimensions of the three-dimensional matrix C[M][N][K] of calibration data.

4. A method as claimed in claim 1, wherein the step of performing singular value decomposition of each the at least one three-dimensional matrix C [M] [N] [K] of calibration data to produce the at least one first unitary rotation matrix U, the at least one diagonal scaling matrix S and the at least one second unitary rotation matrix V comprises:
    swapping over second and third dimensions N and K of the three-dimensional matrix C[M][N][K] of calibration data to provide a rearranged three-dimensional matrix C [M] [K] [N]; and
    decomposing each of N 2-D matrix X[M][K] into the matrices U, S, and V by singular value decomposition to provide the resized first unitary rotation matrices U of size M-by-M, the resized diagonal scaling matrices S of size M-by-K, and the resized second unitary rotation matrices V of size K-by-K, wherein N matrices X[M] [N] are provided and wherein each matrix X[M] [K] is composed by the first and second dimensions of the rearranged three-dimensional matrix C[M][N][K].

5. A method as claimed in claim 1, wherein the step of performing singular value decomposition of each the at least one three-dimensional matrix C[M][N][K] of calibration data to produce the at least one first unitary rotation matrix U, the at least one diagonal scaling matrix S and the at least one second unitary rotation matrix V comprises:
    rearranging each three-dimensional matrix C[M][N][K] of calibration data by merging second and third dimensions N and K as a first dimension of a single two-dimensional matrix X[N*K][M]; and
    decomposing the two-dimensional matrix X[N*K][M] by singular value decomposition to produce the resized first unitary rotation matrix U of size N*K-by-N*K, the resized diagonal scaling matrix S of size N*K-by-M, and the resized second unitary rotation matrix V of size M-by-M.

6. A method as claimed in claim 1, wherein resizing of the first unitary rotation matrix U comprises discarding one or more columns of the first unitary rotation matrix U.

7. A method as claimed in claim 6, wherein resizing of at least some of the first unitary rotation matrix U comprises keeping the first P columns and discarding other columns of the first unitary rotation matrix U.

8. A method as claimed in claim 1, wherein:
    resizing of the diagonal scaling matrix S comprises discarding one or more columns and one or more rows of the diagonal scaling matrix S, and optionally resizing of at least some of the diagonal scaling matrix S by keeping the first Q rows and the first Q columns and discarding other columns and rows of the diagonal scaling matrix S, and/or resizing of the second unitary rotation matrix V comprises discarding one or more rows of the second unitary rotation matrix V, and optionally resizing of at least some of the second unitary rotation matrix V by keeping the first Q rows and discarding other rows of the second unitary rotation matrix V, and/or resizing at least some of each of the first unitary rotation matrix U, the diagonal scaling matrix S and the second unitary rotation matrix V comprises:
  discarding one or more columns of the first unitary rotation matrix U;
  discarding one or more columns and one or more rows of the diagonal scaling matrix S; and
  discarding one or more rows of the second unitary rotation matrix V.

9. A method as claimed in claim 1, wherein the at least one three-dimensional matrix of calibration data comprises first and second three-dimensional matrices Cv[M][N][K] and Ch[M][N][K] of calibration data, each three-dimensional matrix relating to a different polarisation.

10. A method of providing antenna array calibration data of a base station to mobile devices using a wireless carrier in a mobile-centric positioning system, the method comprising:
  storing data selected from plural matrices of compressed calibration data, wherein the one or more matrices together define at least one three-dimensional matrix C[M][N][K] of uncompressed calibration data and comprise at least one first unitary rotation matrix U, at least one diagonal scaling matrix S and at least one second unitary rotation matrix V obtained by singular value decomposition, wherein [M] is a matrix of azimuthal angle of departure of a signal from the base station and having a range between 0 and 360 degrees, [N] is a matrix of elevation angle of departure of the signal from the base station and having a range between 0 and 90 degrees, and [K] is a matrix of channels for transmitting or receiving orthogonal polarisation signals through an array antenna of the base station; and
  causing transmission of a first layer of each of the plural matrices of compressed calibration data;
  determining whether or not a second layer of the plural matrices is needed;
  on a negative determination, refraining from transmitting [[a]]the second layer of the plural matrices; and
  on a positive determination, causing transmission of the second layer of each of the plural matrices subsequent to and separately from transmitting the first layers of the resized matrices.

11. A method as claimed in claim 10, further comprising:
  determining whether or not a third layer of the plural matrices is needed;
  on a negative determination, refraining from transmitting the third layer of the plural matrices; and
  on a positive determination, causing transmission of the third layer of each of the plural matrices of compressed calibration data subsequent to and separately from transmitting the data comprising the second layers of the plural matrices of compressed calibration data.

12. A method of processing antenna array calibration data of a base station received from the base station over a Bluetooth Low Energy (BLE) carrier in a mobile-centric positioning system, the method comprising:
  receiving data comprising a first layer of each of plural matrices of compressed calibration data, wherein the compressed calibration data is the antenna array calibration data;
  using the data comprising the first layer of each of the plural matrices of the compressed calibration data and not using the other layers of the plural matrices to reconstruct plural matrices of compressed calibration data, the plural matrices comprising at least one first unitary rotation matrix U, at least one diagonal scaling matrix S and at least one second unitary rotation matrix V;
  performing matrices multiplication of U, S and V to obtain the reconstructed matrices;
  receiving positioning packets over the Bluetooth Low Energy (BLE) carrier; and
  computing a bearing based on the reconstructed matrices by operating on the received positioning packets with the reconstructed matrices through using a positioning algorithm configured to perform a correlation analysis between the received positioning packets and the reconstructed matrices.

13. A method as claimed in claim 12, further comprising:
  receiving data comprising a second layer of each of the plural matrices of compressed calibration data subsequent to and separately from receiving the data comprising the first layer of each of the plural matrices of compressed calibration data.

14. A method as claimed in claim 13, further comprising:
  using the data comprising a second layer of each of the plural matrices of compressed calibration data to reconstruct the plural matrices of compressed calibration data.

15. A method as claimed in claim 13, further comprising:
  reconstructing plural matrices of uncompressed calibration data by summing matrices derived from the data comprising the second layer of each of the plural matrices of compressed calibration data with matrices derived from the data comprising the first layer of each of the plural matrices of compressed calibration data.

16. A method as claimed in claim 13, further comprising:
  receiving data comprising a third layer of each of the plural matrices of compressed calibration data subsequent to and separately from receiving the data comprising the second layers of the plural matrices of compressed calibration data, and optionally reconstructing plural matrices of uncompressed calibration data using the data comprising the third layer of each of the plural matrices of compressed calibration data, and optionally reconstructing the plural matrices of uncompressed calibration data by summing matrices derived from the data comprising the first and second layers of each of the plural matrices of compressed calibration data with matrices derived from the data comprising the third layer of each of the plural matrices of compressed calibration data.

17. A method as claimed in claim 12, comprising:
  reconstructing at least two three-dimensional matrices C[M][N][K] of uncompressed calibration data, wherein [M] is a matrix of azimuthal angle of departure of a signal from the base station and having a range between 0 and 360 degrees, [N] is a matrix of elevation angle of departure of the signal from the base station and having a range between 0 and 90 degrees, and [K] is a matrix of channels for transmitting or receiving orthogonal polarisation signals through an array antenna of the base station, and wherein each three-dimensional matrix relates to a different polarisation, and/or calculating a bearing to apparatus using the plural matrices of uncompressed calibration data, and/or deleting the reconstructed calibration data from memory and saving the data comprising the one or more layers of compressed calibration data in memory.

18. An apparatus comprising at least one processor, at least one memory and computer-readable code stored on the at least one memory which when executed controls the at least one processor to perform the method of claim 1.

19. An apparatus comprising at least one processor, at least one memory and computer-readable code stored on the at least one memory which when executed controls the at least one processor to perform the method of claim 10.

20. An apparatus comprising at least one processor, at least one memory and computer-readable code stored on the at least one memory which when executed controls the at least one processor to perform the method of claim 12.

* * * * *